United States Patent [19]

Maekawa et al.

[11] Patent Number: 5,216,461
[45] Date of Patent: Jun. 1, 1993

[54] CONTROL SYSTEM FOR COPYING MACHINE WITH IMPROVED COMMUNICATION FUNCTION TO CENTRALIZED CONTROL UNIT

[75] Inventors: Kazunobu Maekawa, Toyokawa; Sumiaki Hirata, Aichi, both of Japan

[73] Assignee: Minolta Camera Kabushiki Kaisha, Osaka, Japan

[21] Appl. No.: 738,239

[22] Filed: Jul. 30, 1991

[30] Foreign Application Priority Data

Jul. 31, 1990 [JP] Japan ................... 2-204260
Jun. 14, 1991 [JP] Japan ................... 3-170524

[51] Int. Cl.⁵ ........................................... G03G 21/00
[52] U.S. Cl. ................... 355/202; 355/204; 355/206
[58] Field of Search ............... 355/200, 203, 204, 205, 355/206, 202; 379/106; 364/184, 185, 186

[56] References Cited

U.S. PATENT DOCUMENTS

| | | | |
|---|---|---|---|
| 3,997,873 | 12/1976 | Thornton | 340/149 R |
| 4,086,434 | 4/1978 | Bocchi | 179/2 AM |
| 4,167,322 | 9/1979 | Yano et al. | 355/204 X |
| 4,322,813 | 3/1982 | Howard et al. | 364/900 |
| 4,361,851 | 11/1982 | Asip et al. | 358/84 |
| 4,390,953 | 6/1983 | Johnstone et al. | 364/474 |
| 4,497,037 | 1/1985 | Kato et al. | 364/900 |
| 4,549,044 | 10/1985 | Durham | 179/5 R |
| 4,583,834 | 4/1986 | Seko et al. | 355/206 |
| 4,739,366 | 4/1988 | Braswell et al. | 355/208 |
| 4,766,548 | 8/1988 | Cedrone et al. | 364/479 |
| 4,797,706 | 1/1989 | Sugishima et al. | 355/200 X |
| 4,979,132 | 12/1990 | Sugimoto | 364/520 |
| 4,994,926 | 2/1991 | Gordon et al. | 358/400 |
| 4,996,703 | 2/1991 | Gray et al. | 379/40 |
| 5,057,866 | 10/1991 | Hill, Jr. et al. | 355/200 |
| 5,077,582 | 12/1991 | Kravette et al. | 355/206 |
| 5,081,680 | 1/1992 | Bennett | 380/50 |
| 5,084,875 | 1/1992 | Weinberger et al. | 371/291 |

FOREIGN PATENT DOCUMENTS 54142559  8/1984  Japan.
60-90460  5/1985  Japan.
63-301667 12/1988  Japan.

OTHER PUBLICATIONS

Lynn S. Ritter, "Remote Diagnostic-Tool Kit of the Future", 1989, pp. 1-6, Dataquest Research Newsletter.

Primary Examiner—Fred L. Braun
Attorney, Agent, or Firm—Burns, Doane, Swecker & Mathis

[57] ABSTRACT

A copying machine control system according to the present invention is a copying machine control system having a data terminal collecting data related to a copying machine and a centralized control station communicating data with the data terminal through a communication network, wherein the centralized control station includes a first communication terminal and a second communication terminal, and the data terminal includes a memory device for storing first and second calling data for calling the first and second communication terminals, respectively, a first calling device for calling the first communication terminal with the first calling data when a predetermined transmission condition is satisfied, a determining device for making a determination that connection can not be made to the first communication terminal in spite of operation of the first calling device, and a second calling device for calling the second communication terminal with the second calling data in response to an output of the determining device.

22 Claims, 28 Drawing Sheets

FIG.3
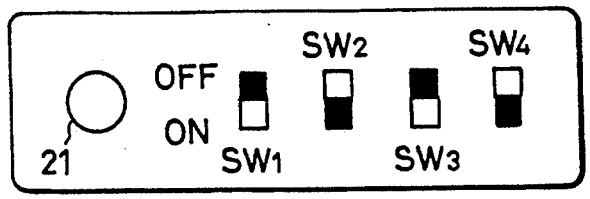
FIG.4
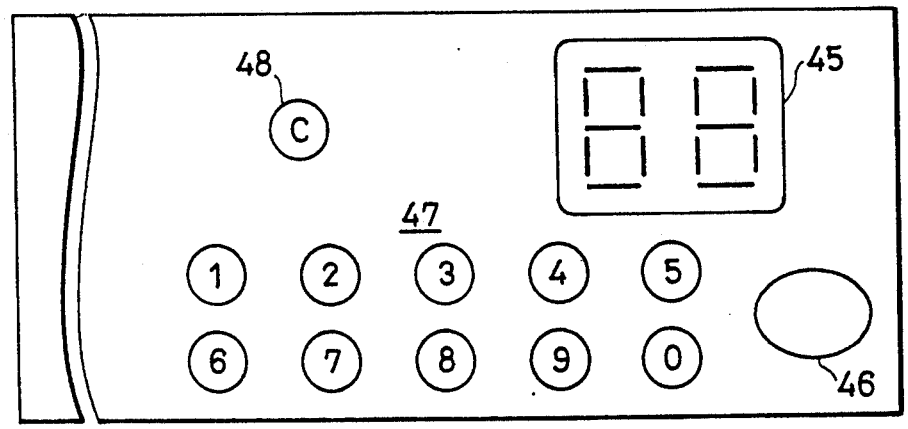
FIG.5
| b7 | b6 | b5 | b4 | b3 | b2 | b1 | b0 |
DISCHARGE CODE : A SHEET OF PAPER
DISCHARGE =
TRAILING EDGE OF b0
JAM CODE : b7 = 1, b6 = 0
TROUBLE CODE : b7 = 1, b6 = 1

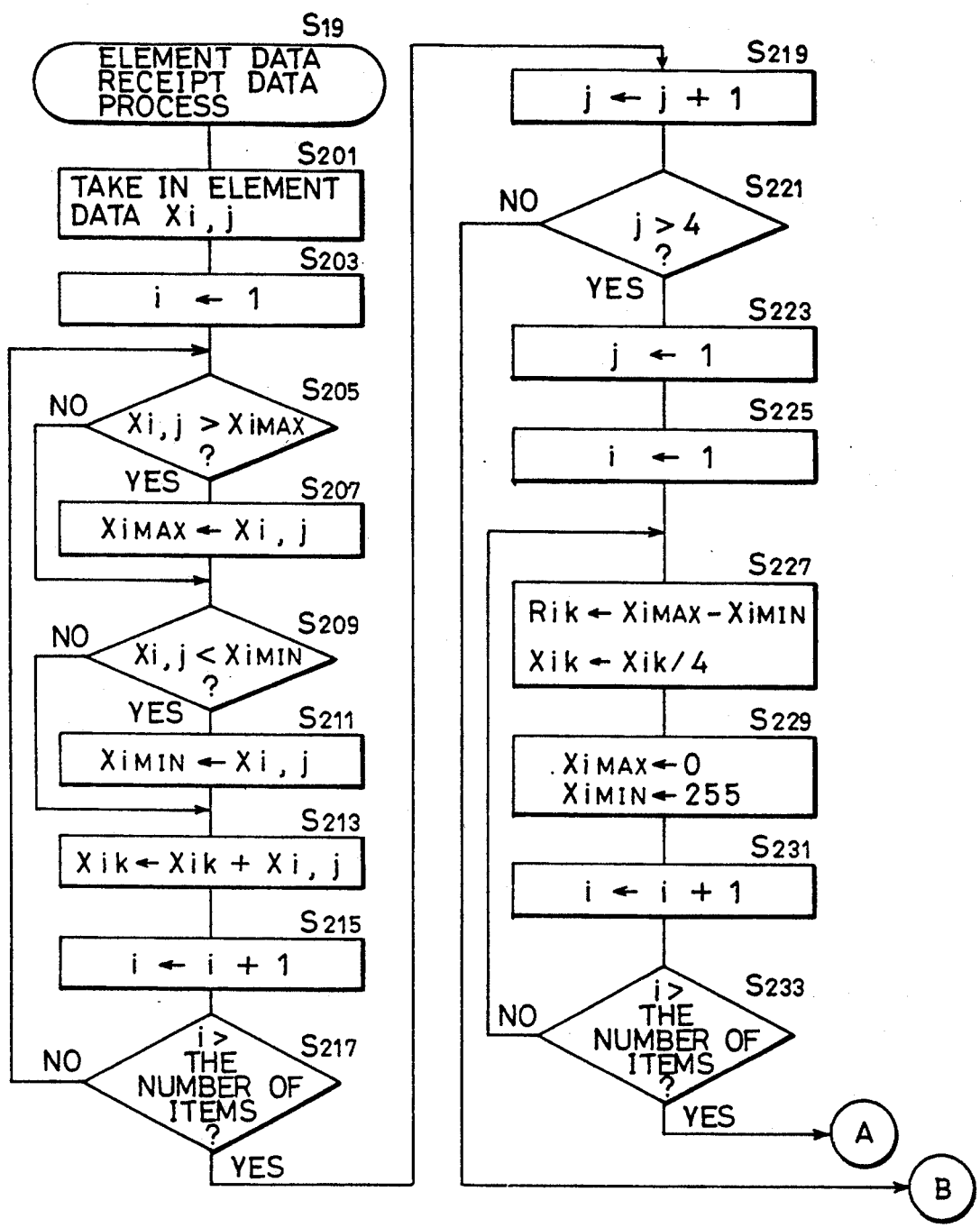

INFORMATION :

THE NUMBER OF

COPIES IN (MONTH);

19__ IN YOUR OFFICE

WAS ◯

FIG. 25

[CONTROL DATA]

| DTID | USER | MODEL | SERIAL No. | FAX No. |
|------|------|-------|------------|---------|
| 0001 | AAA | EP1 | 000001 | OX-XXX-XXXX |
| 0002 | BBB | EP2 | 000001 | OY-YYY-YYYY |
| 0003 | CCC | AX1 | 000005 | OZ-ZZZ-ZZZZ |
| 0004 | DDD | EP1 | 000014 | OT-TTT-TTT |
| 0005 | EEE | EP1 | 000003 | OU-UUU-UUU |

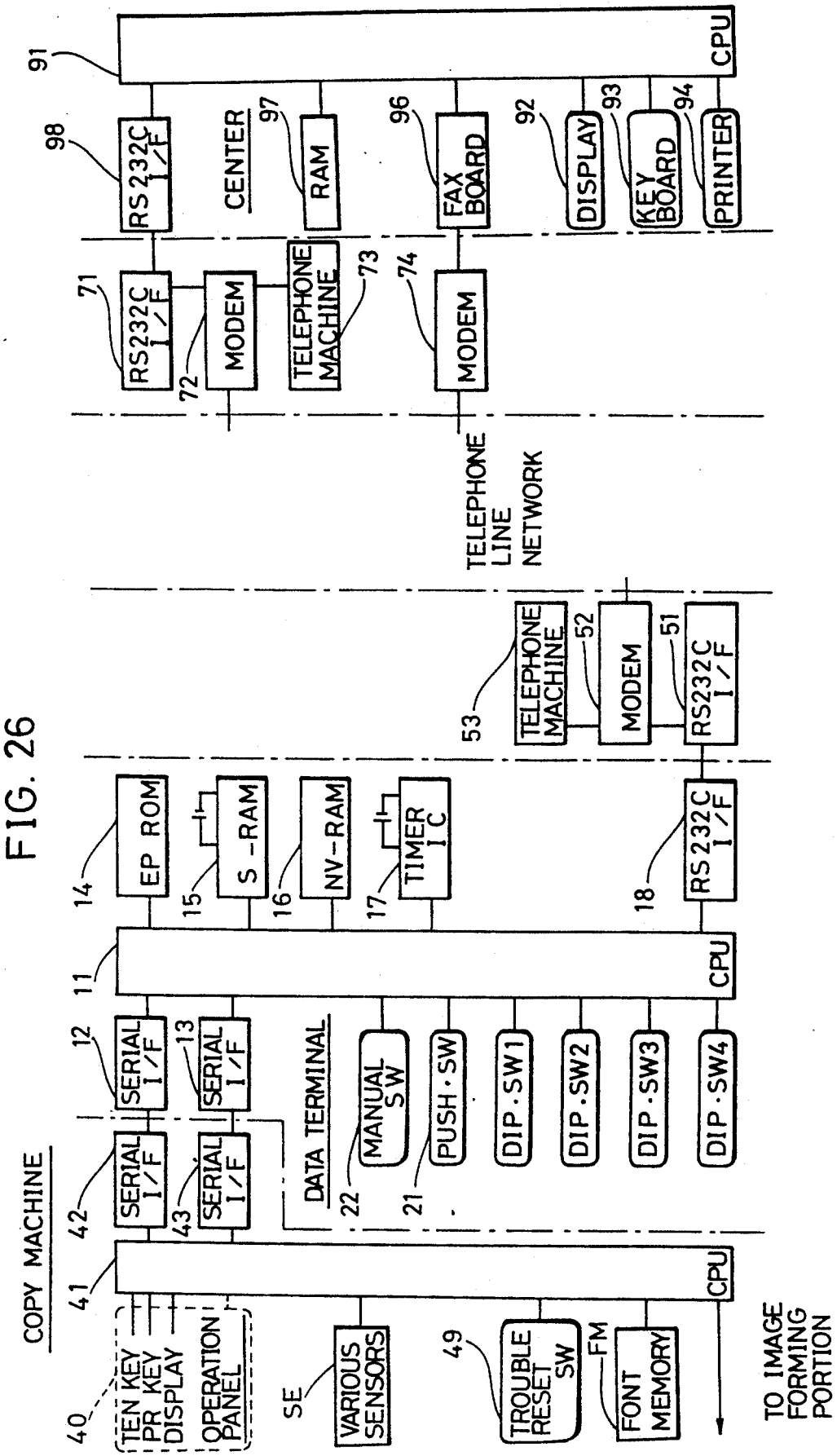

CONTROL SYSTEM FOR COPYING MACHINE WITH IMPROVED COMMUNICATION FUNCTION TO CENTRALIZED CONTROL UNIT

BACKGROUND OF THE INVENTION

1. Field of the Invention

The present invention relates to control systems for copying machines, and particularly to control systems for copying machines in which data for controlling copying machines are transmitted to a centralized control unit on a center side.

2. Description of the Related Art

A system for controlling a plurality of copying machines is disclosed in U.S. Pat. No. 4,583,834. In this disclosed system, various information of copying machines such as the total number of copies, troubles, remaining quantities of copy sheets and toner are transmitted to a computer. The computer processes the transmitted information and feeds back instructions to copying machines.

According to such a system, a plurality of copying machines supplied to users are connected to a centralized control unit through a communication network such as telephone liens for remote control of the copying machines. The centralized control unit is provided at a control base, and the controlling party receives with the centralized control unit the information transmitted from respective copying machines. Then, controlling works such as the issue of bills corresponding to the number of copies and dispatch of servicemen corresponding to the troubles are made.

Since general copying machines do not have functions of communicating with a centralized control unit through a communication network, a data terminal is attached to a copying machine for communication when configuring said system. This data terminal collects various information from the copying machine and communicates with the centralized control unit on the basis of the collected information.

The communication between each data terminal and the centralized control unit is made when predetermined conditions are satisfied. For example, when the current time comes to a predetermined time which is assigned to each data terminal, and also when a trouble of a copying machine occurs, each data terminal calls the centralized control unit. In this case, calls from a plurality of data terminals may overlap. Specifically, when a certain data terminal calls the centralized control unit in response to a trouble of the copying machine during the centralized control unit is in communication with another data terminal, the communication can not be established because the communication line is already occupied. Accordingly, the trouble of the copying machine can not be immediately informed to the centralized control unit, resulting in delay in taking care of the trouble by the management party.

SUMMARY OF THE INVENTION

It is an object of the present invention to provide a copying machine controlling system capable of controlling a plurality of copying machines in good time.

It is another object of the present invention to provide a copying machine controlling system capable of certainly performing information communication.

It is still another object of the present invention to provide a copying machine control system capable of making communication between data terminals and a centralized control unit by voice or facsimile communication.

In order to achieve the above objects, a copying machine control system according to a certain aspect of the present invention is a copying machine control system including a data terminal collecting data related to a copying machine and a centralized control station for data communication with the data terminal through communication network, wherein the centralized control station includes a first communication terminal and a second communication terminal, and the data terminal includes storing means for storing first and second calling data for calling the first and second communication terminals, respectively, a first calling means for calling the first communication terminal with the first calling data when predetermined transmission condition is satisfied, determining means for determining that connection can not be made with the first communication terminal in spite of operation of the first calling means, and second calling means for calling the second communication terminal with second calling data in response to a determination output of the determining means.

In a copying machine control system configured as described above, the second communication terminal is called when connection can not be made with the first communication terminal, so that the possibility of establishing information communication and the reliability of the control system are enhanced.

In order to achieve the above objects, a copying machine control system according to another aspect of the present invention is a copying machine control system including a data terminal collecting data related to a copying machine and a centralized control station which communicates data with the data terminal through a communication network, wherein the centralized control station includes a computer collecting data from the data terminal receiving means to be called with particular first calling data for inputting data transmitted through the communication network from the data terminal in a computer, and a telephone machine which is called with particular second calling data, and the data terminal includes storing means for storing the first and second calling data, first communication means for calling the receiving means with the first calling data when predetermined transmission condition is satisfied and for communicating data after connection is made with the receiving means, determining means for making a determination that connection is not made with the receiving means in spite of operation of the first calling means, and second communication means for calling the telephone machine with the second calling data in response to a determination output of the determining means and for communicating with voice after connection is made with the telephone machine.

In a copying machine control system configured as described above, when connection can not be made with the receiving means, the telephone machine at the centralized control station is called for communication by voice, so that urgent data communication is surely made.

In order to achieve the above objects, a copying machine control system in accordance with still another aspect of the present invention is a centralized control apparatus for receiving data related to a plurality of copying machines through a communication network and controlling each of the copying machines, including receiving means for receiving count data of the number of copies in the plurality of copying machines, totalizing means for totalizing the received count data for each copying machine, storing means for storing a telephone number of a facsimile apparatus provided corresponding to each of the copying machines, and transmitting means for transmitting image data based on the totalized count data to each facsimile apparatus provided corresponding to each of the copying machines.

A copying machine control unit configured as described above transmits image information based on the totalized count data to a facsimile corresponding to each of the copying machines, so that the timely control of the copying machines is possible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for describing operation switches of the data terminal of FIG. 1.

FIG. 4 is a diagram for describing the operation panel of a copying machine to which the data terminal in FIG. 1 is connected.

FIG. 5 is a diagram for describing structure of data transmitted to the data terminal from the copying machine in FIG. 1.

FIGS. 10A and 10B are flow charts showing specific contents of a element data receiving data processing routine of FIG. 7.

FIG. 24 is a diagram showing one example of image information transmitted to the copying machine side in the fourth embodiment of the present invention.

FIG. 25 is a diagram showing one example of contents stored in advance in a memory of the center side computer as control information in the fourth embodiment of the present invention.

FIG. 26 is a block diagram showing circuit structure of a copying machine control system according to the fifth embodiment of the present invention.

DESCRIPTION OF THE PREFERRED EMBODIMENTS

The first embodiment of the present invention is described below.

Entire Structure of System

First, referring to FIGS. 1-5, schematic structure of the present system is described.

Figure 1:
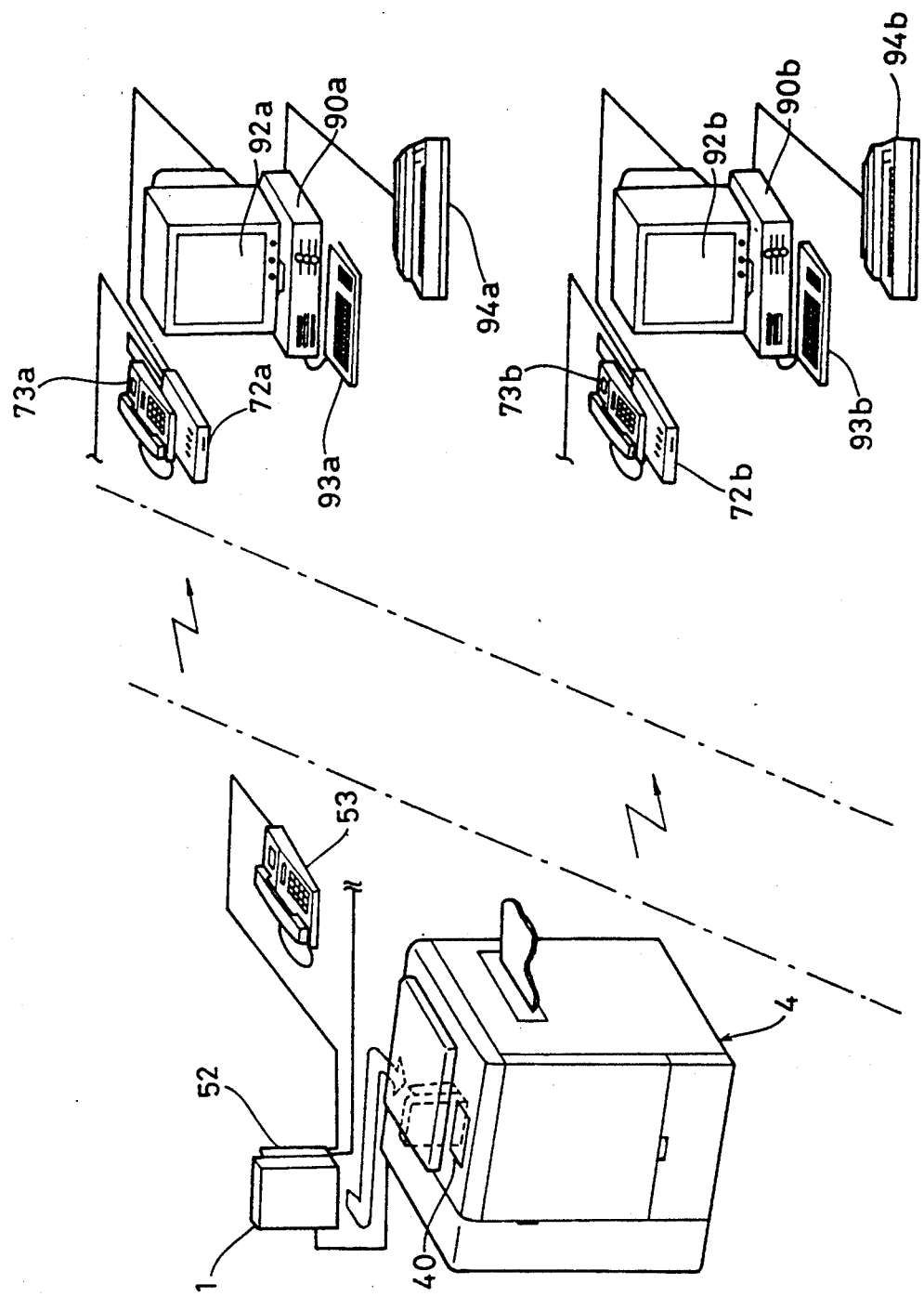
FIG. 1 is a diagram showing structure of a copying machine control system according to the first embodiment of the present invention.
Figure 2:
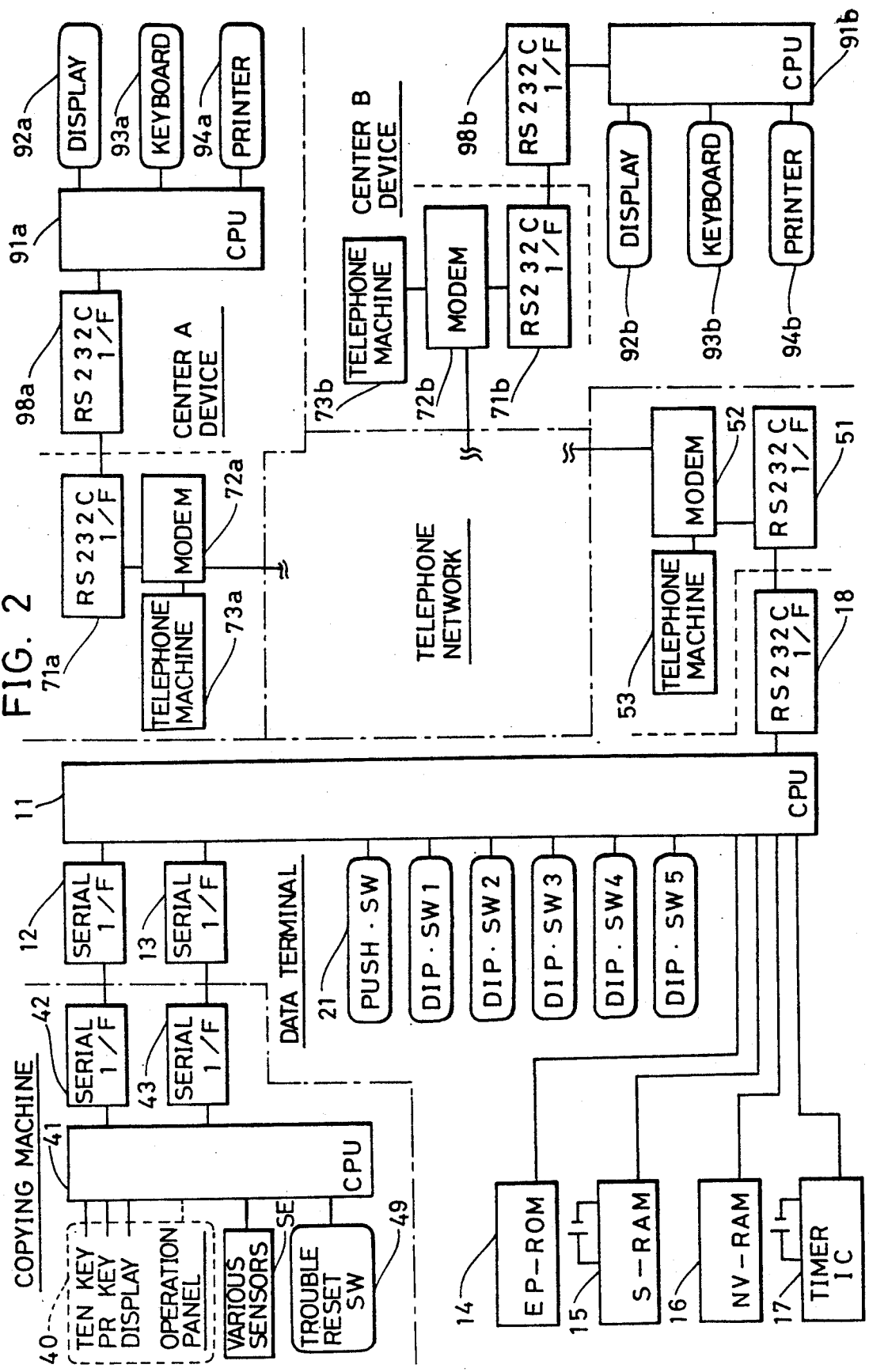
FIG. 2 is a block diagram showing circuit structure of the system shown in FIG. 1.

As shown in FIGS. 1 and 2, the present system includes a number of user side devices (a set of user side devices is shown in the figure), two sets of devices on the center (a center A device, and a center B device), and a communication line (telephone line) network connecting the above.

A copying machine 4, a DT (Data Terminal) 1, a modem 52 which functions as a communication terminal device, and a telephone machine 53 as a communication device are provided on the user side. The data terminal 1 accepts various information from copying machine 4 and applies predetermined processes to the information, and transmits the information to the center side.

On the other hand, two sets of devices, a center A device and a center B device are provided on the center side, which include modems 72a, 72b which function as communication terminal devices, computers (main bodies 90a, 90b, displays 92a, 92b, keyboards 93a, 93b, printers 94a, 94b), and telephone machines 73a, 73b which are communication devices, respectively. The communication lines of the center A device and the center B device are independent of each other.

Next, each device will be described.

Copying Machine 4

Copying machine 4 is an apparatus for forming a copied image on paper by original image scanning.

In copying machine 4, various kinds of element data having effects upon the image forming process (a time required for paper transport, a surface potential of a photoreceptor drum, a toner concentration in a developer, an amount of exposure of the photoreceptor drum, a developing bias voltage, an amount of toner sticking on photoreceptor drum, a grid voltage of a corona charger, etc.) are detected by a group of various sensors SE, which are taken in and processed in CPU 41, and then transmitted to CPU 11 of DT 1 through a serial I/F43 and a serial I/F13. The above-described various kinds of element data are expressed in an abstract manner as element data $X_i$ (i=1—the number of items of the element data) in the description of flow charts described later.

In copying machine 4, each of counted values is counted in each counter as a base of an amount of charge asked from the management side (a total counter indicating the number of times of paper discharge and a counter for each paper size indicating the number of sheets used for each paper size), counters as criteria for maintenance (a JAM counter for each portion indicating the number of jams for each portion, a trouble counter for each portion indicating the number of troubles for each portion, and a PM counter for each part indicating the number of times each part is used), and transmitted to CPU 11 of DT 1 through serial I/F42 and serial I/F12. The PM counter is a counter for counting the number of times each part is used, which is a criterion of the time for parts replacement.

Also, copying machine 4 performs predetermined operation/mode settings with signals from various kinds of key switches on the operation panel (FIG. 4) (a print (PR) key 46 for commanding start of copying operation, a group of ten keys 47 for numerical input, a clear key 48 for commanding to clear input data, etc.), various kinds of switches out of the operation panel (a trouble reset switch 49 for commanding reset of troubles, etc.), and transmits a corresponding signal as needed to CPU 11 of DT 1 through serial I/F42 and serial I/F12. Numerical data displayed in display portion 45 is also included in the transmitted data.

Data Terminal 1

Data terminal 1 is a device which accepts and processes data of copying machine 4, and when predetermined transmission condition (the condition under which a transmission flag is set to "1": refer to the description of control described later about more details) is satisfied, activates modem 52 to connect the communication line to center A device for transmitting various kinds of control data (element data, count data, etc.) of the copying machine. When the communication line can not be connected to the center A device and the urgency level is high, the data terminal 1 activates modem 52 to connect the communication line to the center B device.

As shown in FIG. 2, a controlling CPU 11 of the data terminal 1 is connected to a ROM 14 in which a control program is stored, a non-volatile memory 16 for storing two selection number data (described later) of the center A device and the center B device, and the like, a S-RAM 15 for works backed up by a battery, and a timer IC 17 similarly backed up by a battery.

Such CPU 11 accepts data transmitted from copying machine 4 through a serial I/F12 or a serial I/F13 and executes various processes described later.

FIG. 5 is a diagram showing structure of 8-bit data $b_7$–$b_0$ inputted to DT 1 through serial I/F12. A paper discharge code indicating discharge of paper is expressed by a trailing edge (a change from "1" to "0") of the bit $b_0$. A JAM code indicating occurrence of a paper jam is expressed by bit $b_7=1$, bit $b_6=0$. A trouble code indicating occurrence of various troubles is expressed by bit $b_7=1$, $b_6=1$. Furthermore, a location of the paper jam and a type of the trouble are indicated by bits $b_5$–$b_1$. The 8-bit data is periodically inputted in DT1 and also inputted when a paper jam or a trouble occurs in a copying machine.

CPU 11 performs predetermined operations, setting of modes and so forth in response to input of operation switches. The above-mentioned operation switches include five dip switches DIP·SW1—DIP·SW5, and a push switch 21.

DIP·SW5 is a switch for setting an initialization mode. DIP·SW1 is a switch for setting a selection number (telephone number) input mode of the center A device, DIP·SW2 is a switch for setting an input mode of an ID number for identifying a data terminal 1 (DTID), DIP·SW3 is a switch for setting an input mode of a common ID number for identifying the center A device and B device (center ID) and DIP·SW4 is a switch for setting a selection number (telephone number) input mode of the center B device, respectively. The push switch 21 is a switch for commanding initialization transmission (refer to FIG. 8, S155) etc..

CPU 11 is connected to modem 52 which is a communication terminal device through the communication interface (RS232CI/F) 18 on CPU 11 side and the communication interface (RS232CI/F) on the modem 52 side. That is, an off-hook signal and a selection number signal of the center A device or the center B device are transmitted through these equipment from modem 52 to the communication network. Thus, the communication line is connected to modem 72a of the center A device or 72b of the center B device to enable communication with the computer of the center A device or the center B device.

The contents of data (data for controlling copying machines) transmitted from data terminal 1 to the center A device or the center B device are determined on the basis of a type of a transmission flag (described later) which is set to "1".

Center Side Equipment

It is computer equipment which is configured to be able to be connected to a large number of data terminals through the communication network, which includes two sets of devices, the center A device and the center B device. Copying machines being connected to respective data terminals are normally controlled by the center A device.

That is, data transmitted from data terminal 1 side to the modem 72a on the center A device through the communication network are sequentially inputted in CPU 91a through the communication interface (RS232CI/F) 71a on modem 72a side and the communication interface (RS232CI/F) 98a on the computer side. CPU 91a processes the data (the element data, count data, etc.) to produce data for controlling the copying machine 4 being connected to that data terminal 1.

Furthermore, a bill is printed out on the basis of the data for control, and determinations as to whether a serviceman should be dispatched or not, as to which parts are to be prepared in the dispatch and the like are made.

In fixed-time communication (communication made with a fixed-time transmission flag set to "1"), fixed time transmission time data for the next time is transmitted to the data terminal 1 side from the CPU 91a side.

As will be described later, the center B device is used for enabling data receiving by securing the communication network with the data terminal 1 when the communication line is occupied on the center A device side when an emergency call is made from the data terminal 1 side.

System Control

Next, referring to FIGS. 6-18, control of the present system is described.

Before describing flow chart, the terms "on edge" and "off edge" are defined. The "on edge" is defined to mean a condition change in which a condition of a switch, a sensor, a signal or the like changes from an off state to an on state. The "off edge" is defined to mean a condition change in which a state of a switch, a sensor, a signal or the like changes from an on state to an off state.

Processes on Copying Machine Side

Figure 6:
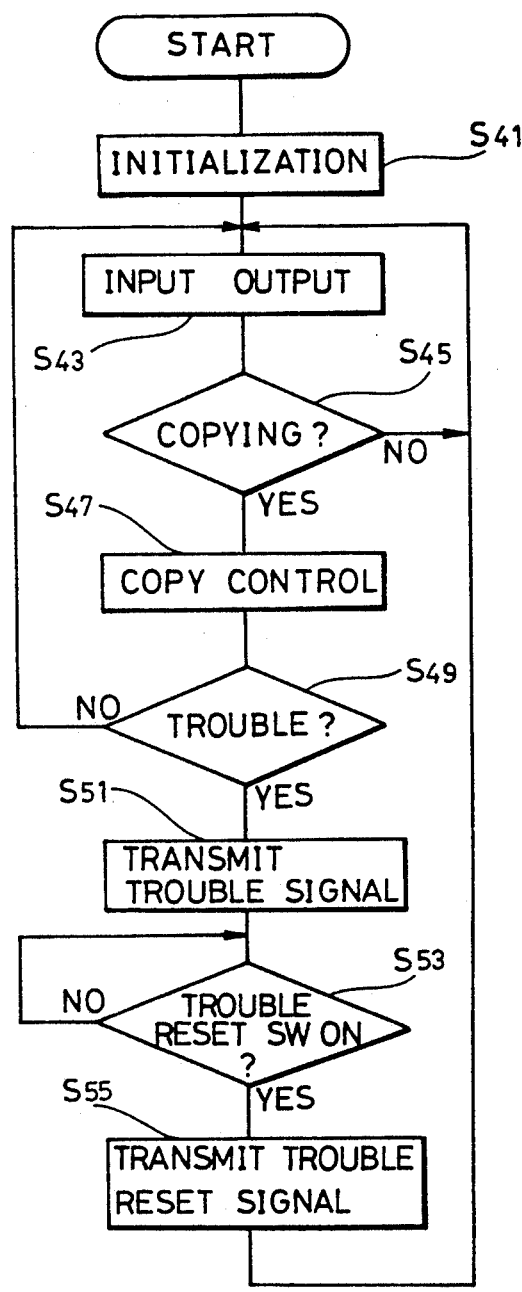
FIG. 6 is a flow chart showing processings by a control CPU of the copying machine of FIG. 2.

First, the processes in control CPU 41 of a copying machine will be described referring to the flow chart of FIG. 6. CPU 41, for example, starts processing upon turn-on of a power source, and makes initialization such as memory clear, standard mode setting or the like (S41). Subsequently, it carries out the processes in steps S43-S49.

Step S43 is a process for accepting data from a group of key switches on operation panel 40 (a group of ten keys 47 for numerical input, a print (PR) key 46 for copy start command, a clear key 48 for set number clear command, etc.), a group of switches such as a trouble reset switch 49 and a group of sensors SE provided in a copying machine, and received data from data terminal 1 side, and also a process for transmitting count data etc. to data terminal 1.

Step S47 is a step collectively indicating processes necessary for copying operation, such as, paper feed control, scanning control, photoreceptor drum control, and developing device control, for example.

After step S51, processes in trouble occurrence are done. That is, when JAM or another kind of trouble occurs (YES in S49), a signal corresponding to that trouble or the like is transmitted to the controlling CPU 11 of data terminal 1 (S51). When trouble reset switch 49 is operated by an operator or the like (YES in S53), similarly to what described above, a trouble reset signal is transmitted to the controlling CPU 11 of data terminal 1 (S55).

Processes on Data Terminal Side

Next, processes in controlling CPU 11 of the data terminal will be described referring to the flow charts shown in FIGS. 7-15.

(a) Main Routine

Figure 7:
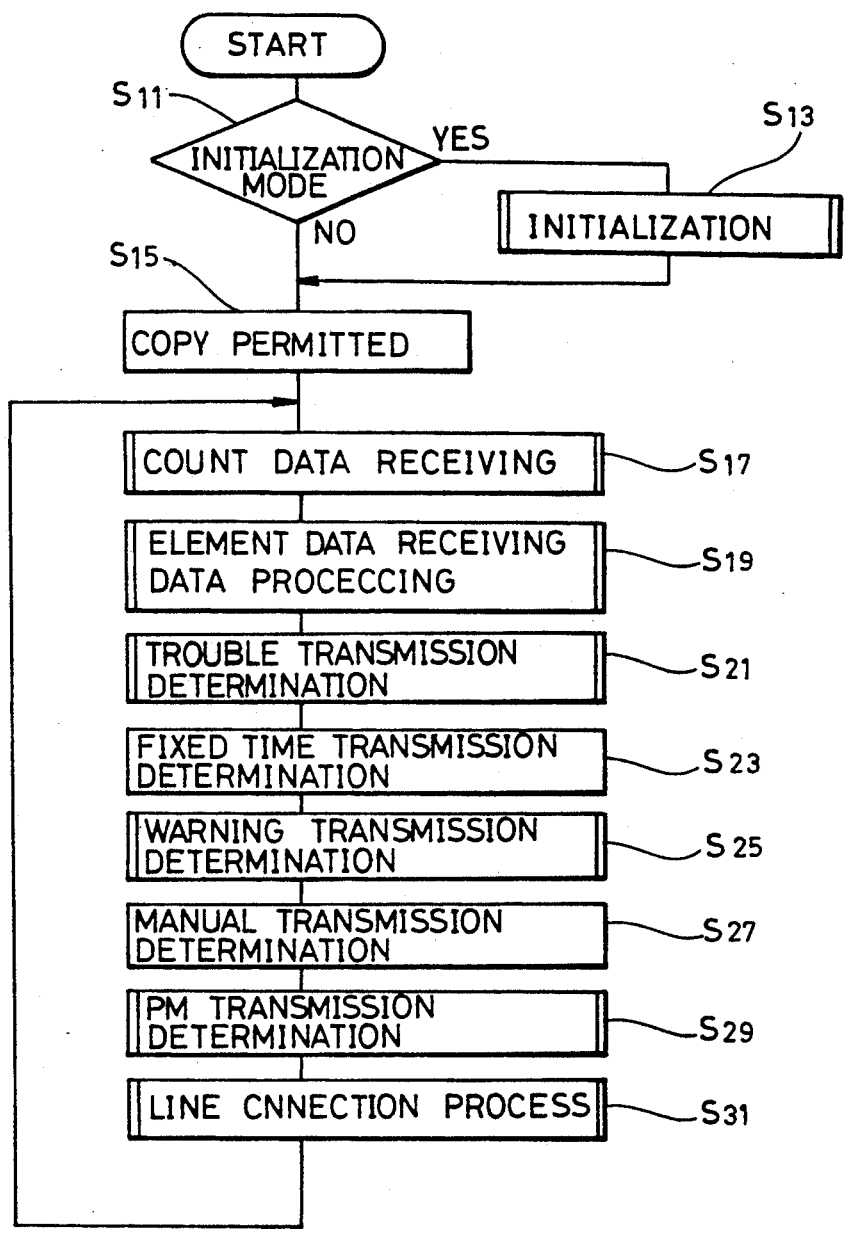
FIG. 7 is a flow chart showing a main routine of a control CPU of the data terminal of FIG. 2.

First, the outline of the processes will be described on the basis of the main routine of FIG. 7.

The controlling CPU 11 starts processing upon turn-on of a power source, carries out an initialization process as required (S13), and then transmits a copy permitting signal to controlling CPU 41 of a copying machine (S15). Subsequently, it proceeds to the repeated loop process of steps S17-S31.

Generally, the following processes are carried out in respective sub routine steps.

Initialization: S13

Upon turn-on of the power source, when dip switch DIP-SW4 is ON, that is, when it is an initialization mode (YES in S11), this routine is executed. As will be described later, setting of a selection (telephone) number of the center A device, an ID number of a data terminal (DTID), an ID number common to the center A and B devices (center ID) and a selection (telephone) number of the center B device, and initialization transmission are made.

Count Data Receipt: S17

A receiving process of various kinds of count data transmitted from controlling CPU 41 of a copying machine is carried out.

The data contents include a discharge code, JAM and trouble codes, JAM and trouble counters, counters for each paper size and a PM counter.

The controlling CPU 11 of a DT updates such data to the newest values and holds the same.

Element Data Receipt and Data Process: S19

As will be described later, CPU 11 sequentially calculates data corresponding to an average value of each element data and a standard deviation to update them to the newest values.

Trouble Transmission Determination: S21

As will be described later, a determination is made as to, for example, whether or not trouble data or trouble recovery data should be transmitted to the center.

Fixed Time Transmission Determination: S23

A fixed time transmission flag is set to 1 at a predetermined fixed time transmission time and various kinds of count data and various kinds of element data are transmitted to the center.

After completion of the transmission by the fixed time transmission, fixed time transmission time data for the next time, current time data and data of the closing date of a bill are transmitted in turn from the center side.

Warning Transmission Determination: S25

As will be described later, element data, a counted value of a JAM counter, and a counted value of a PM counter are compared with predetermined threshold values, respectively.

On the basis of the results thereof, a determination is made as to whether or not warning data, warning recovery data should be transmitted to the center.

Manual Transmission Determination: S27

When it is not in the initialization mode, when push switch 21 is turned on, a manual transmission flag is set to 1.

By this, various count data, various element data are transmitted to the center.

PM Transmission Determination: S29

As will be described later, a count value before clearing the PM counter in which a count value is cleared to "0" by parts replacement is transmitted to the center.

Line Communication Process: S31

As will be described later, when any of transmission flag is set to "1", a first communication terminal device (modem 72a of the center A device) on the center is called. After connection is made to CPU 91a of the center A device, the data communication is executed.

If modem 72a is in use when a measure should be taken immediately such as in trouble occurrence, the second communication terminal device (modem 72b of the center B device) is called, and the data related to the trouble is transmitted to CPU 91b of the center B device.

(b) Sub Routine

Next, details of respective sub routine steps are sequentially described referring to FIGS. 8-15.

Figure 8A:
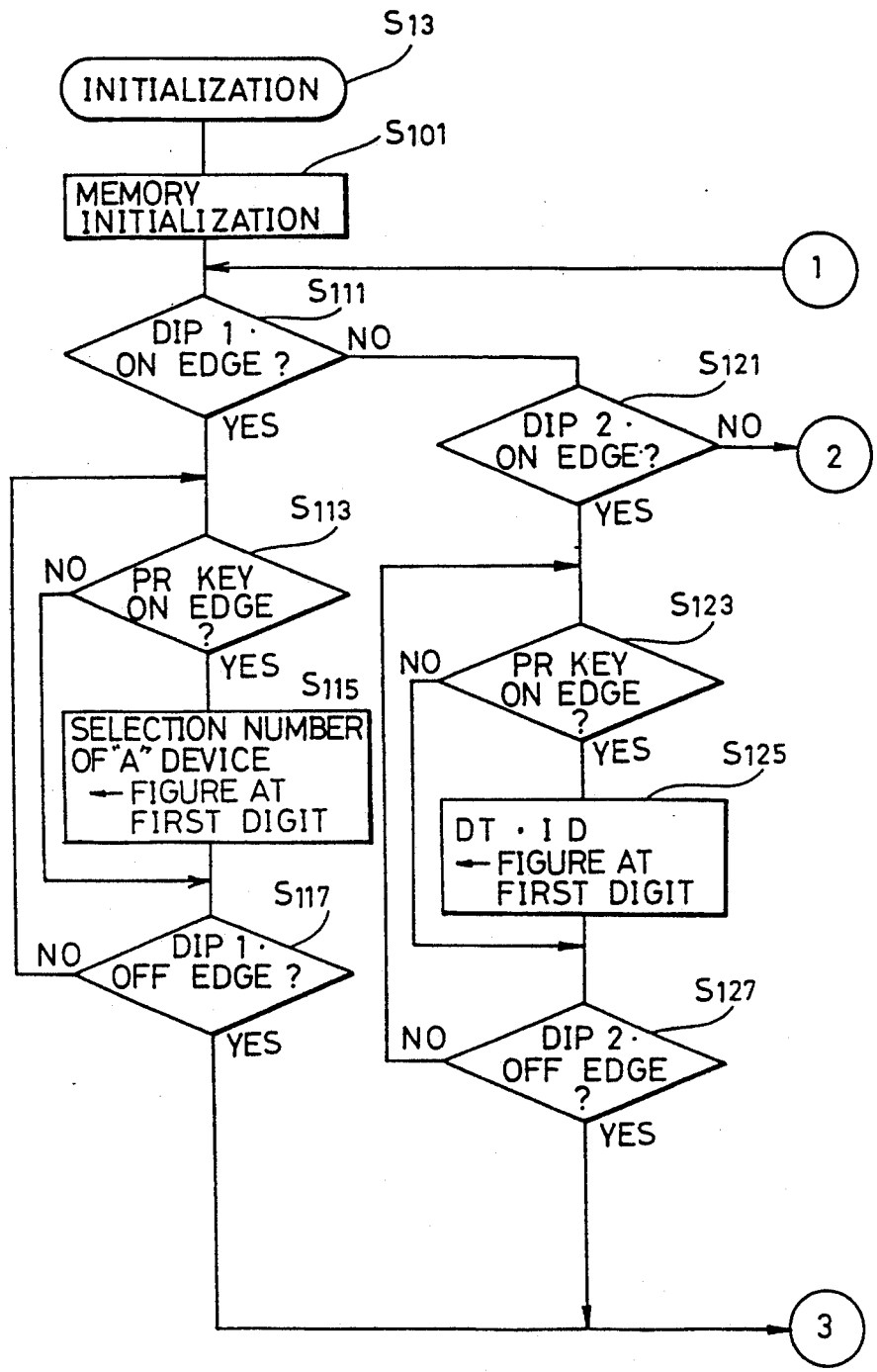
FIGS. 8A and 8B are flow charts showing specific contents of an initialization routine of FIG. 7.
Figure 8B:
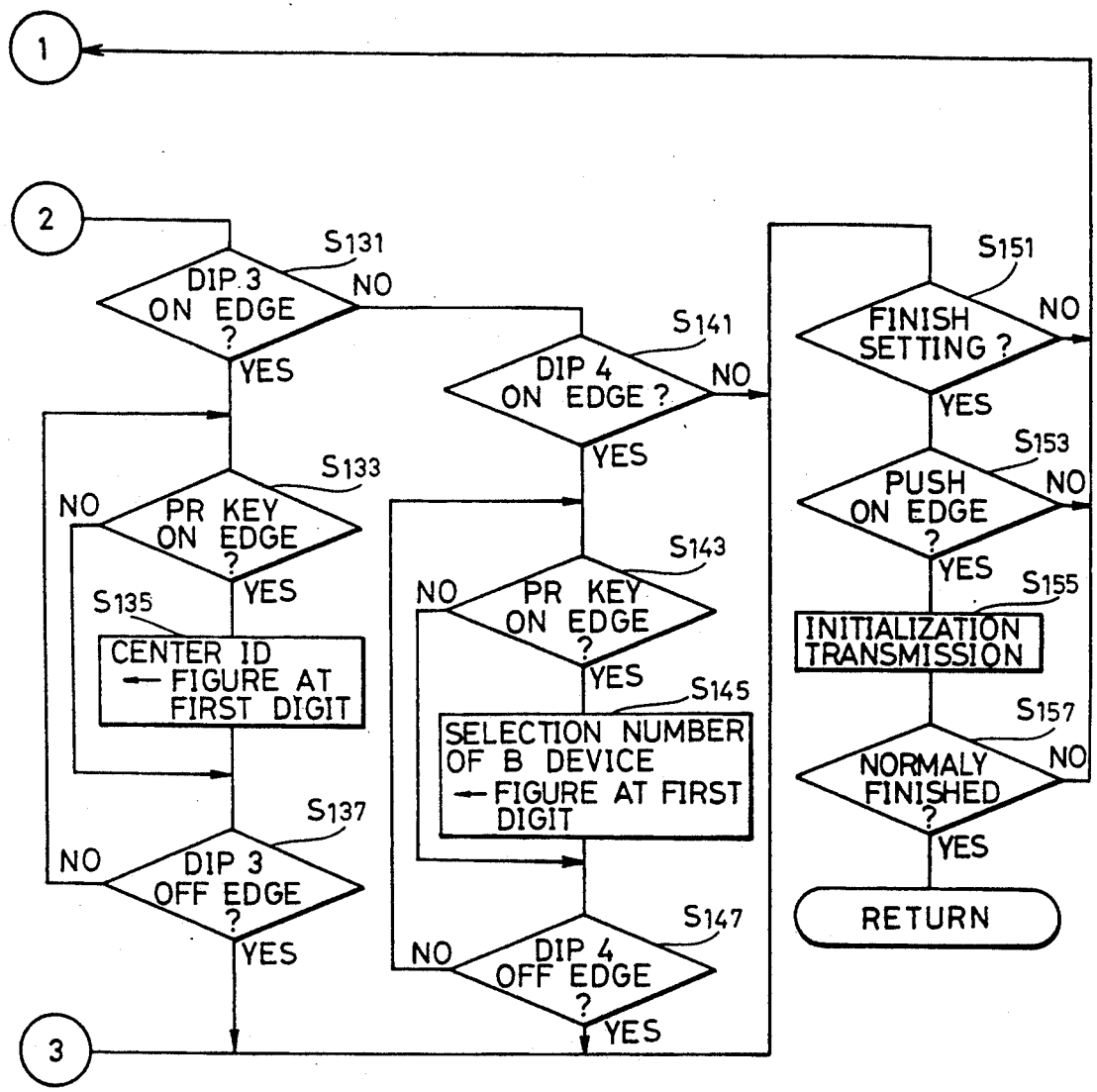

Initialization Process (FIGS. 8A and 8B)

The present process is executed when dip switch DIP·SW5 is ON (YES in S11) when the power supply is turned on. In the process, initialization of the selection number of the center A device, the ID number of the data terminal (DTID), and the common ID number (center ID) of the center A device and B device and the selection number of the center B device is accepted and initialization transmission is done.

First, memory 15 is initialized (S101), and ON of four dip switches DIP·SW1−DIP·SW4 are stood by.

When DIP·SW1 is turned on (YES in S111), an input mode of the selection number (telephone number) of modem 72a of the center A device is implemented. That is, a figure inputted with ten key 47 of the copying machine and displayed at the first digit of display portion 45 is stored in a nonvolatile memory 16 (S115) as selection number data of modem 72a in response to input of print key 46 (YES in S113). The selection number input mode of modem 72a is released with OFF of DIP·SW1 (S117).

Similarly, in response to ON of DIP·SW2 (YES in S121), an input mode of DTID is set, and a figure displayed at the first digit of display portion 45 is stored in nonvolatile memory 16 (S125) as DTID data in response to input of print key 46 (YES in S123). The DTID input mode is released with OFF of DIP·SW2 (S127).

Similarly, in response to ON of DIP·SW3 (YES in S131), an input mode of the center ID (the common ID of the center A device and the center B device) is set and a figure displayed at the first digit of display portion 45 is stored in nonvolatile memory 16 as the common center ID data (S135) for every input of print key 46 (YES in S133). The center ID input mode is released with OFF of DIP·SW3 (S137).

Similarly, when DIP·SW4 is turned on (YES in S141), an input mode of a selection number (telephone number) of modem 72b of the center B device is implemented. That is, a figure inputted with ten key 47 of the copying machine and being displayed at the first digit of display portion 45 is stored in non-volatile memory 16 as selection number data of modem 72b corresponding to an input of print key 46 (YES in S143) (S145). The selection number input mode for modem 72b is canceled upon OFF of DIP·SW4 (S147).

When setting of four kinds of data are thus all finished (YES in S151), the push switch 21 is made valid. When the push switch 21 is depressed (YES in S153), initialization transmission is made to the center A device (S155).

That is, after the line is connected to the center A device side, the above-described two kinds of ID data are transmitted to CPU 91a of the center A device. After the transmission is finished, the data transmitted from CPU 91a of the center A device (the closing date of count data, fixed time transmission time for the next time, current time, a threshold of the warning determination) is received.

When the above transmission and receipt are finished, a determination is made as to whether the communication has been normally made or not (S157).

As a result, when the communication has not been normally made (NO in S157), the flow returns to step S111, and another ON of push switch 21 is waited for.

When the communication has been normally made (YES in S157), the flow returns to the main routine to carry out the processes after step S15.

Figure 9:
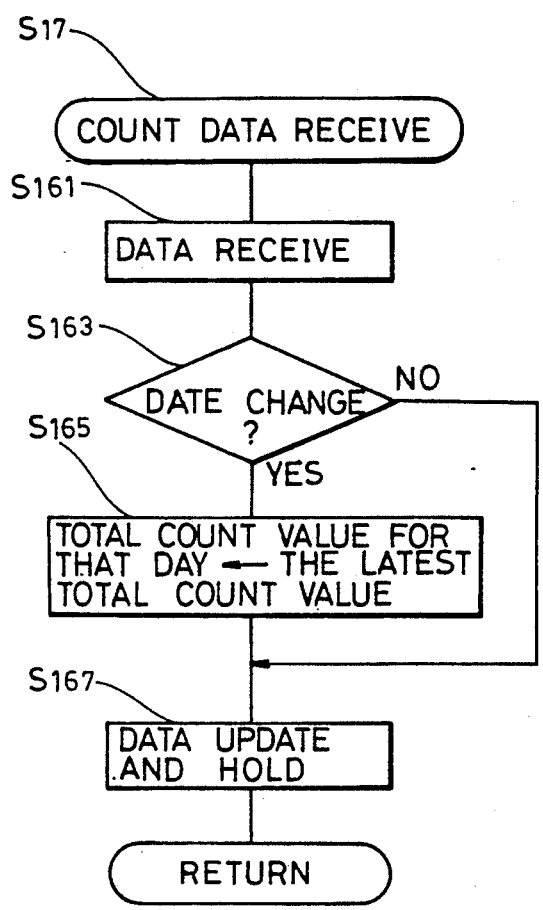
FIG. 9 is a flow chart showing specific contents of a count data receiving routine of FIG. 7.

Count Data Receipt (FIG. 9)

First, various count data transmitted from copying machine 4 are accepted through serial I/F12 (S161) and stored in corresponding memory areas (S167).

Also, with the timing at which the date changes (for example, at 0:00 A.M.) (YES in S163), a value of the total counter indicating the total number of copies of the copying machine is stored corresponded to the date of that day as a total count value of that day (S165).

Figure 10B:
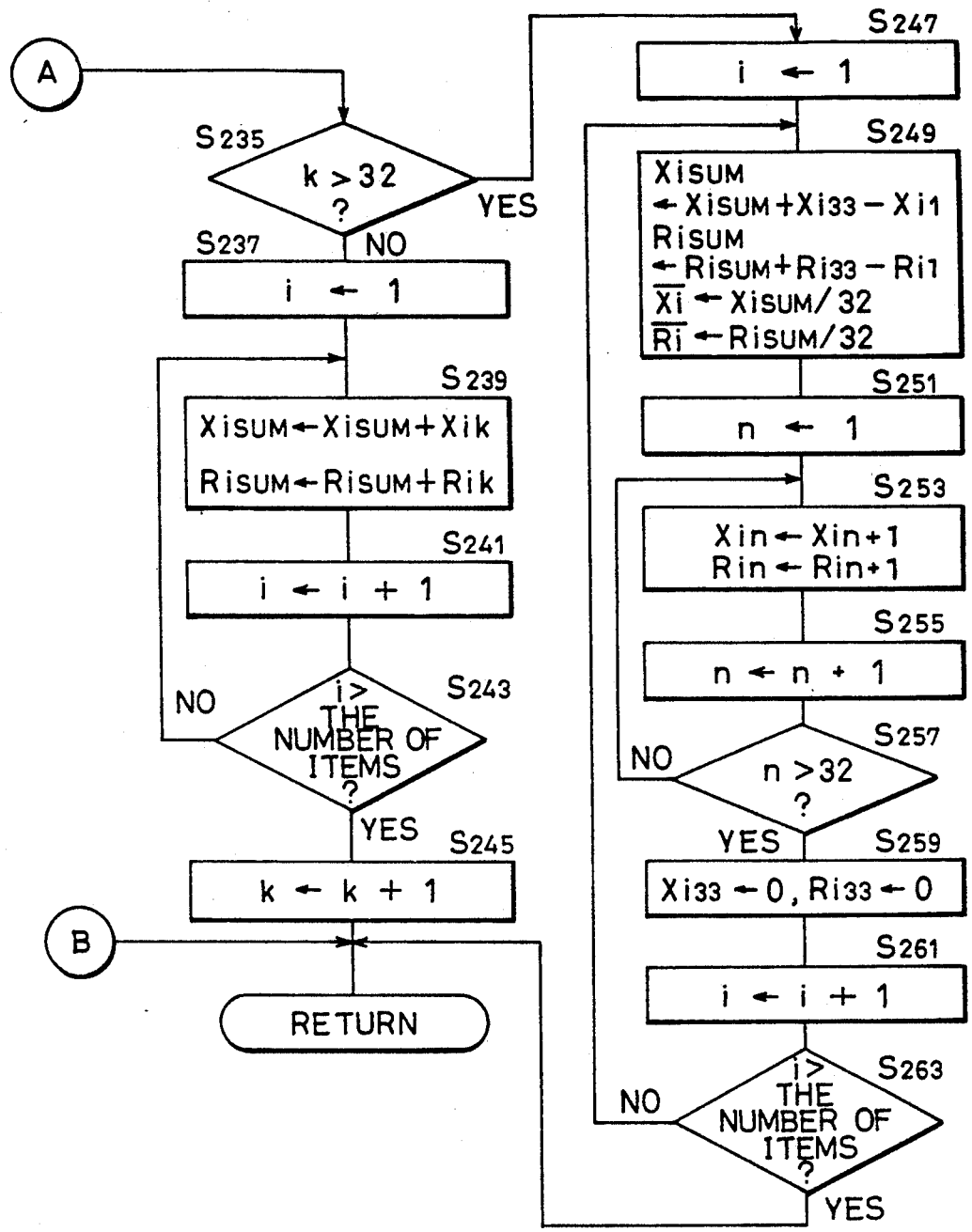
Figure 11:
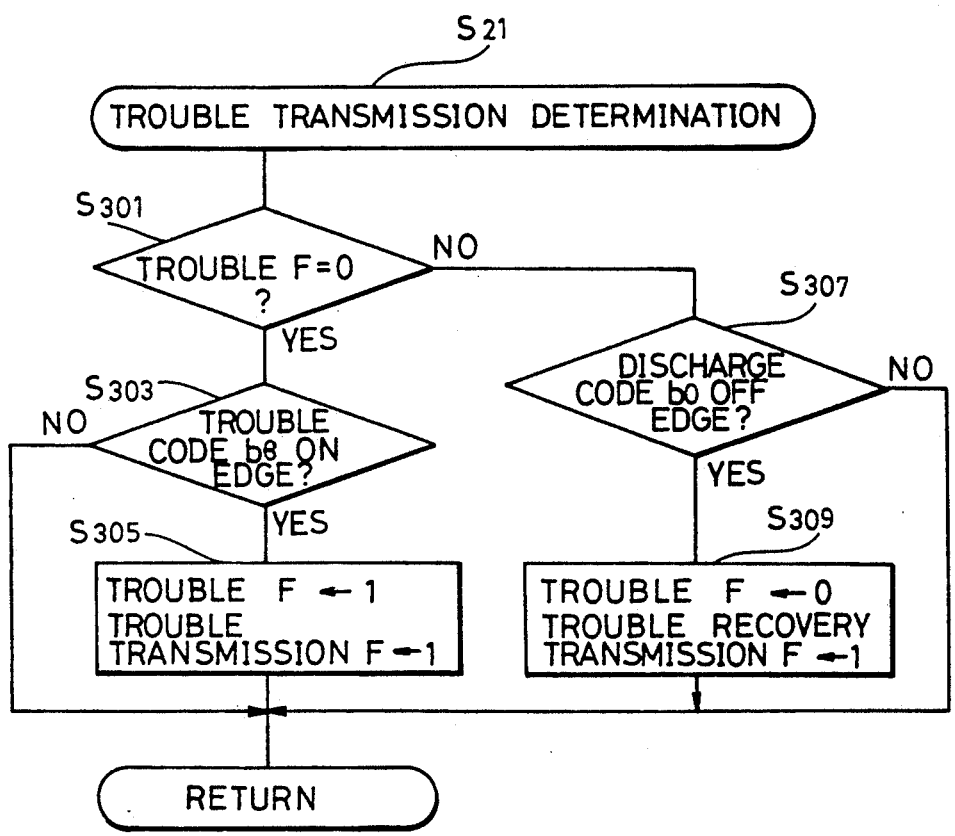
FIG. 11 is a flow chart showing specific contents of a trouble transmission determination routine of FIG. 7.

Element Data Receiving, etc. (FIGS. 10A and 10B)

In this sub routine process, data for comparison with a threshold value (refer to FIGS. 12A and 12B, the warning transmission determination) is calculated on the basis of the element data transmitted from a copying machine.

First, a group of element data $X_{i,j}$ transmitted from a copying machine for every discharge of copy paper are taken in from serial I/F13 (S201). Here, the subscript i expresses an item number of the element data and the subscript j expresses the order in each item.

Next, after substituting an initial value 1 for the item number i (S203), CPU 11 sequentially updates the maximum value $X_{iMAX}$, the minimum value $X_{iMIN}$ and a sum $X_{ik}$ for each item (S205-S217).

Subsequently, the subscript j is incremented (S219), and when j is equal to or smaller than 4, the flow returns to the main routine.

In this way, when the processes of steps S201-S217 are carried out four times for each item (S221; YES), the subscript j is reset to 1 (S223), an initial value 1 is substituted into the item number i (S225), and the difference $R_{ik}$ between the maximum value and the minimum value and an average value $X_{ik}$ of four pieces of data are respectively calculated for each item (S227-S233). In step S229, initial values of the maximum value $X_{iMAX}$ and the minimum value $X_{iMIN}$ are given for preparation of processes in the next steps S205-S211.

After the processes of the above S227-S233, the processes of steps S237-S245, or of steps S247-S263 are carried out.

Steps S237-S245 are processes for a case in which the total of the processes of above S227-S233 does not reach thirty three times, wherein a sum $R_{iSUM}$ of the difference $R_{ik}$ between the above-mentioned maximum value and the minimum value and a sum $X_{iSUM}$ of the average value $X_{ik}$ of the above-mentioned four pieces of data are calculated for the data for thirty two times for each item.

Steps S247-S263 are processes for the case in which the total of processes in the above S227-S233 is thirty three times or more, wherein a sum $R_{iSUM}$ of the above difference $R_{ik}$, and a sum $X_{iSUM}$ of the above average value $X_{ik}$ are calculated for the newest data for thirty two times for each item, and also calculating average values $\overline{X_{ik}}$ $\overline{R_i}$, respectively.

As described above, an average value $\overline{X_i}$ of the newest 128 ($=4\times32$) pieces of data and an average value of deviations (a value corresponding to the standard deviation) $\overline{R_i}$ are obtained for each item of the element data.

Trouble Transmission Determination (FIG. 10)

The process is a sub routine for controlling trouble transmission and trouble recovery transmission.

That is, when "trouble flag=0" (YES in S301), if a trouble code is detected from a copying machine (YES in S303), the trouble flag and a trouble transmission flag are set to "1", respectively (S305).

Upon setting of the trouble transmission flag, the line connection process (FIGS. 14A-14C) is executed and trouble data is transmitted to the center A device. When the center A device is "(the line is) busy", transmission to the center B device is made as will be described later.

In a condition of "trouble flag=1" (NO in S301), when a paper discharge code from a copying machine is detected (YES in S307), the trouble flag is reset to "0", and the trouble recovery transmission flag is set to "1" (S309). This is because the paper discharge in a copying machine is operation which is performed after trouble recovery. Upon setting of the trouble recovery transmission flag, the line connection process (FIGS. 14A-14C) is executed, and the trouble recovery data is transmitted to the center A device.

Figure 12A:
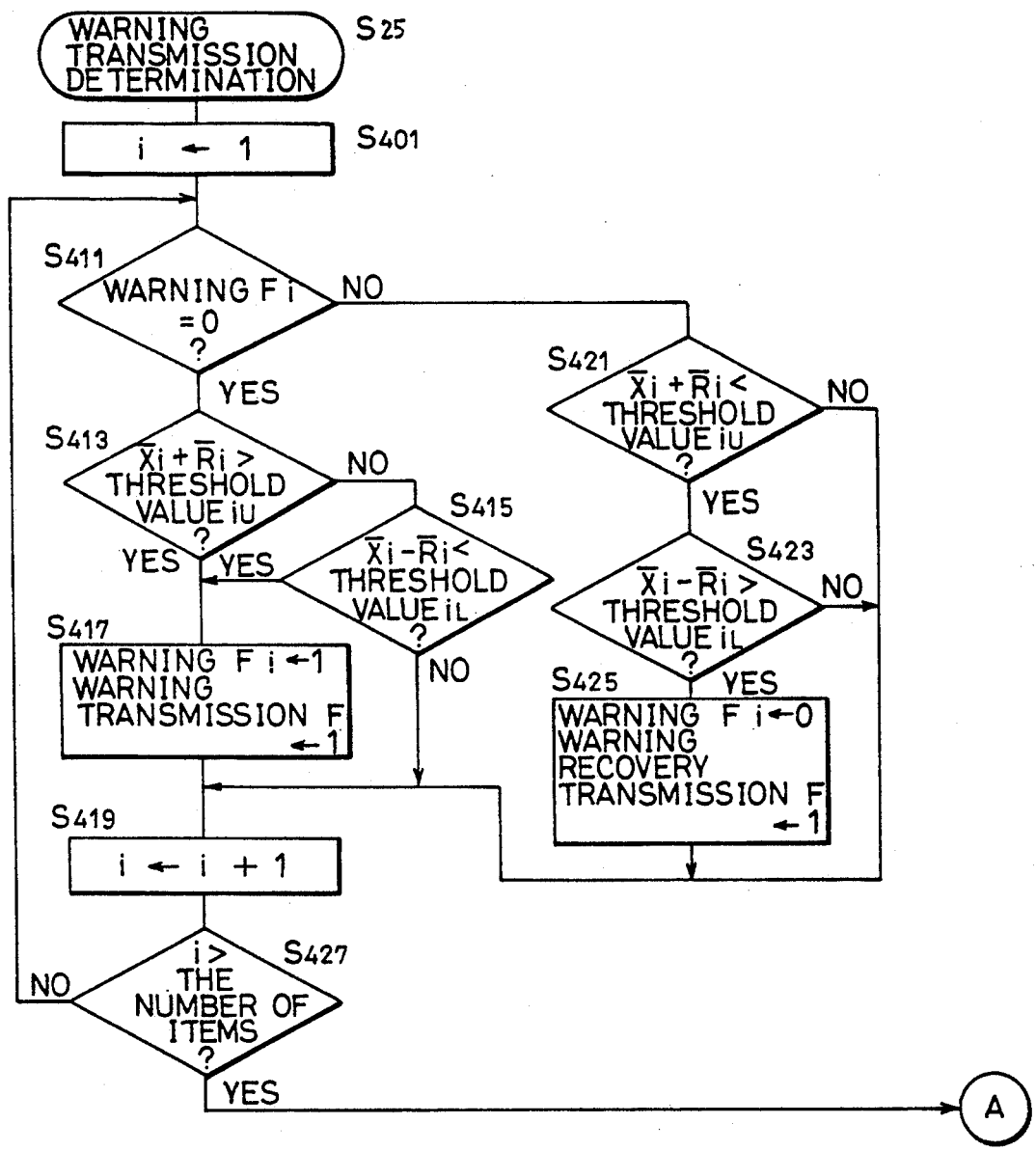
FIGS. 12A and 12B are flow charts showing specific contents of a warning transmission determination routine of FIG. 7.
Figure 12:
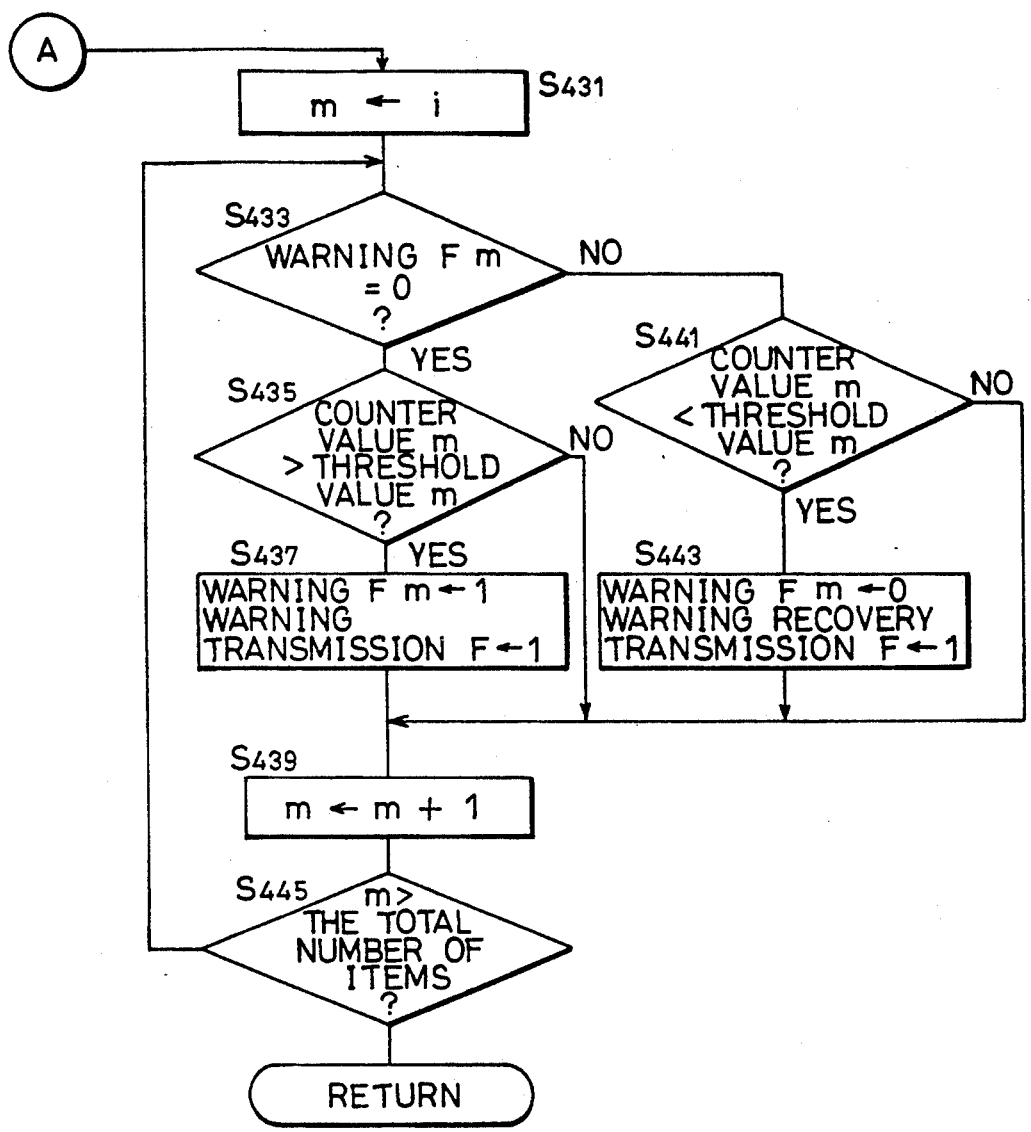

Warning Transmission Determination (FIGS. 12A and 12B)

This routine is a subroutine for controlling the warning transmission and the warning recovery transmission.

Steps S401 through S427 are processes for making warning transmission when a value of element data gets out of a peculiar permittable range, and warning recovery transmission when it recovers into the permittable range, respectively.

First, an initial value "1" is set in the item number i indicating a type of the element data (S401).

Next, in step S411, a warning flag about objective element data (in the first time, the first element data) is examined.

As the result, when the warning flag about the particular element data is "0" (YES in S411), a determination is made as to whether or not the element data value is in the permittable range peculiar to the element data, in other words, whether or not it is in the range not more than an upper limit threshold value $i_U$ and not less than a lower limit threshold value $i_L$. When it is out of the permittable range (YES in S413 or YES in S415), a warning flag $F_i$ about the particular element data and a warning transmission flag are set to "1", respectively (S417). By this, the line communication process is carried out and warning data is transmitted to the center A device.

On the other hand, when a warning flag of the objective element data is "1" (NO in S411), a determination is made as to whether the value of the element data has recovered into the above-mentioned permittable range or not. If it has recovered (YES in S421 and YES in S423), a warning flag $F_i$ about the particular element data is reset to "0", and the warning recovery transmission flag is set to "1". By this, the line communication process is carried out, and warning recovery data is transmitted to the center A device.

After performing such processes until i attains the number of items of the element data, in other words, after performing processes with respect to all the element data, the flow proceeds to the processes after step S431.

Steps S431-S445 are processes for making warning transmission when count values (frequency) of the JAM counter and the PM counter exceed peculiar threshold values, and warning recovery transmission when they recover below the threshold values, respectively.

First, an initial value "i (the last number of the element data +1)" is set in the item number m indicating types of a JAM counter and a PM counter (S431).

Next, in step S433, a warning flag about the objective JAM counter or PM counter is examined.

As a result, when the warning flag about the particular JAM counter or PM counter is "0" (YES in S433), a determination is made as to whether or not the value of the counter is in a permittable range peculiar to the counter, or whether it exceeds the threshold value or not. When it exceeds the same (YES in S435), the warning flag $F_m$ and the warning transmission flag about the particular counter are set to "1", respectively (S437). By this, the line communication process is carried out and warning data is transmitted to the center A device.

On the other hand, when a warning flag about the objective JAM counter or PM counter is "1" in the above-mentioned S433 (NO in S433), a determination is made as to whether the value of the particular counter has been recovered below the above threshold value or not. In the case of recovery (YES in S441), the warning flag $F_m$ about the particular counter is reset to "0", and the warning recovery transmission flag is set to "1". By this, the line communication process (FIG. 13) is carried out and the warning recovery data is transmitted to the center A device.

CPU 11 performs such processes until m attains the total number of items of element data and counters, in other words, after performing with respect to all the counters, it returns to the main routine.

As described above, the warning transmission and the warning recovery transmission are controlled.

Figure 13:
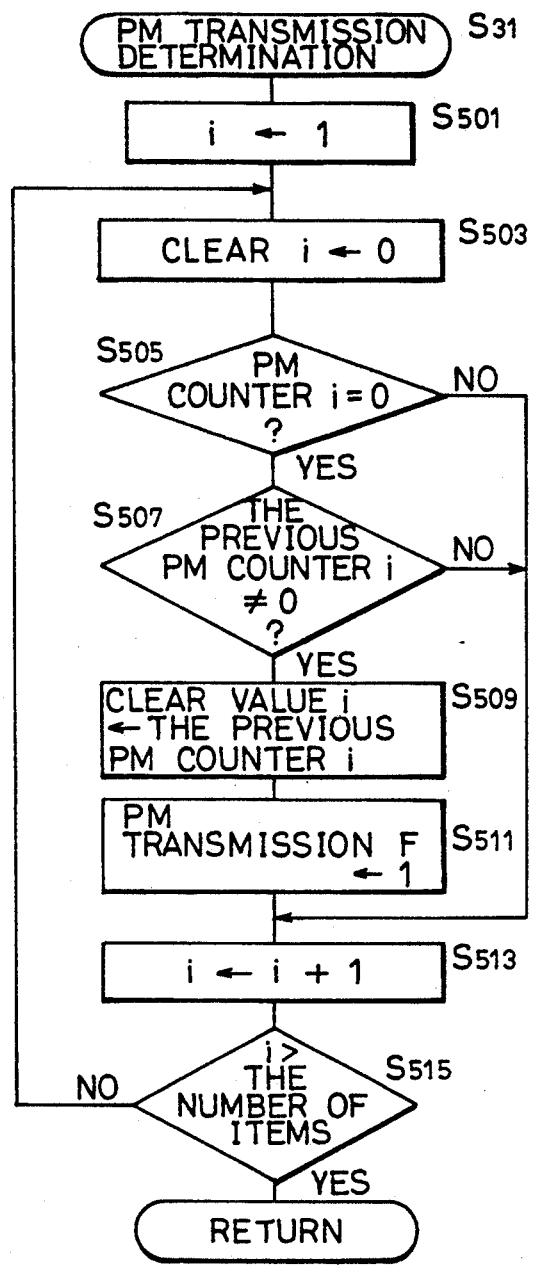
FIG. 13 is a flow chart showing specific contents of the PM transmission determination routine of FIG. 7.

PM Transmission Determination (FIG. 13)

In this process, the PM transmission is controlled.

First, an item number i indicating a type of a PM counter is set to an initial value "1" (S501), and after the processes in steps S503-S511 are carried out, the value of i is incremented, that is, changing a type of PM counter, the above processes are repeated.

Here, the processes in the above S503-S511 are processes for retaining a count value immediately before clearing the PM counter (S509) and setting the PM transmission flag to "1" (S511) when the PM counter is cleared (YES in S505 and YES in S507). A PM counter is cleared by a serviceman when replacing parts corresponding to the PM counter.

When "PM transmission flag=1", the line connection process is carried out, and the PM data (types of replaced parts, a count value immediately before the replacement) are transmitted to the center A device.

Figure 14A:
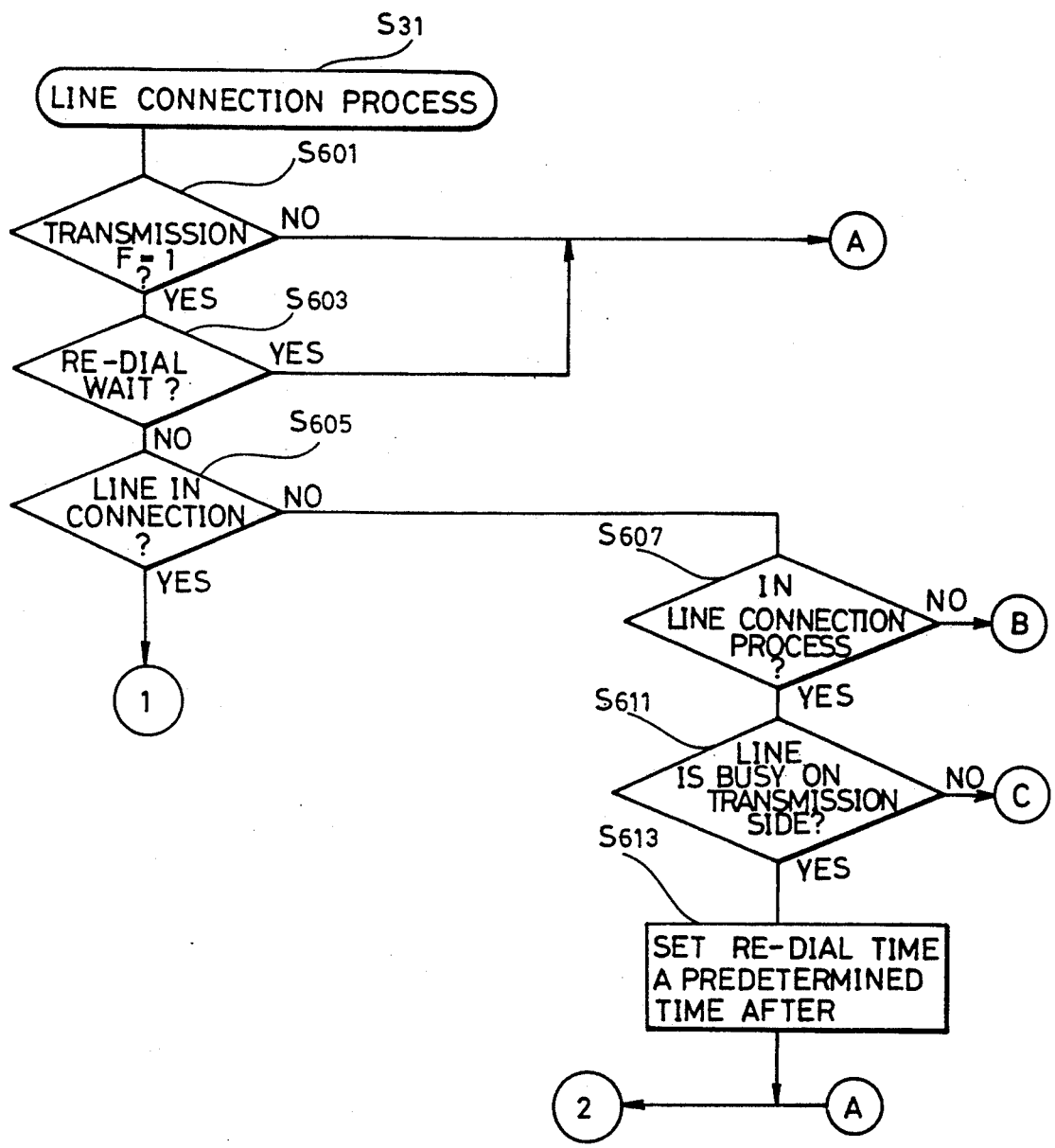
FIGS. 14A through 14C are flow charts showing specific contents of the line connection process routine of FIG. 7.
Figure 14B:
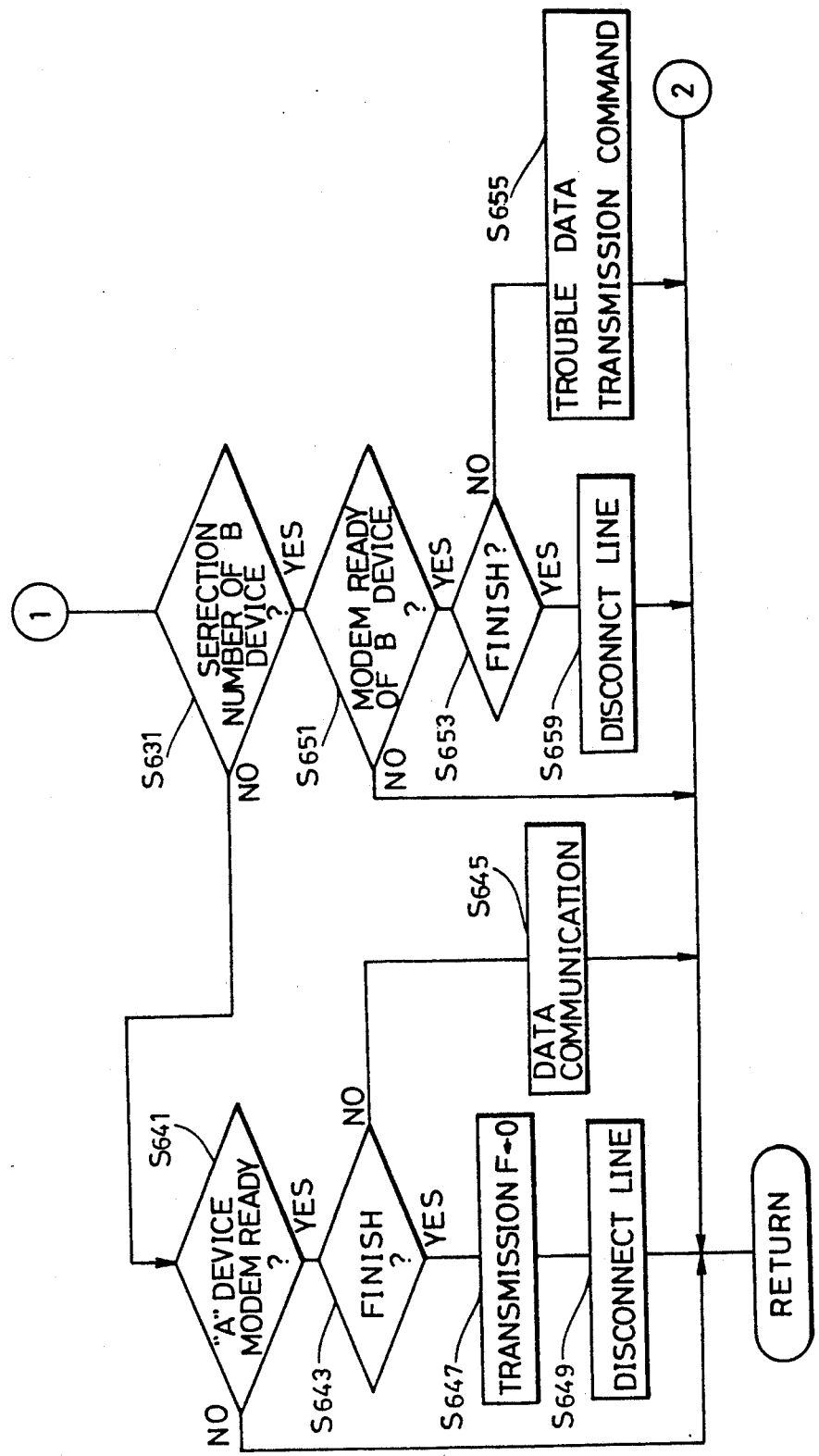
Figure 14C:
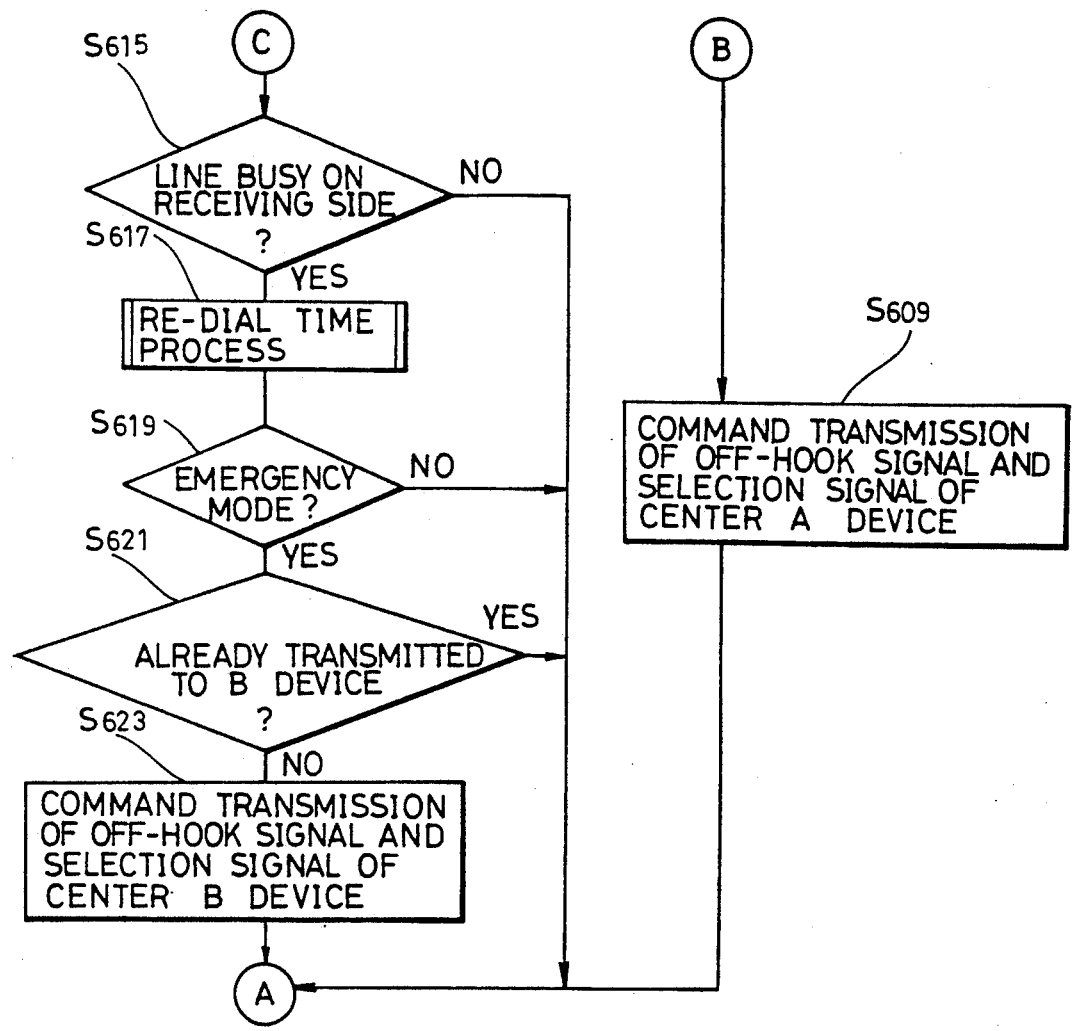
Figure 15:
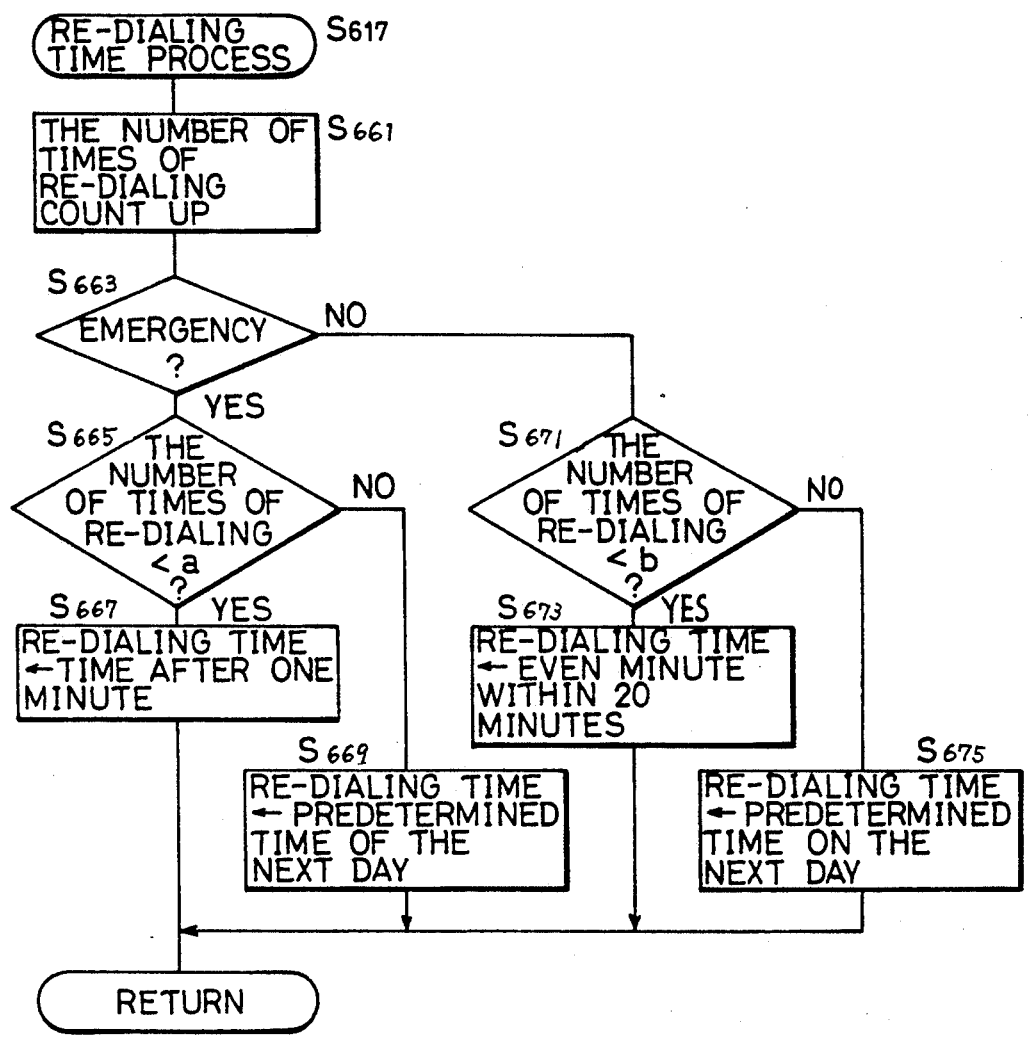
FIG. 15 is a flow chart showing specific contents of the re-dial time process routine of FIG. 14C.

Line Connection Process (FIGS. 14A-14C)

In this process, the center (the center A device or the center B device) is called in response to "any transmission flag=1" and data corresponding to the transmission flag is transmitted.

First, when any of transmission flags is set to "1" (YES in S601), on conditions that it is not in a re-dial standby (NO in S603), the communication line is not connected to modem 72a (or modem 72b) on the center side, and that an off-hook signal and a selection number signal (a selection number signal of modem 72a, or a selection number signal of modem 72b) are not transmitted to the communication line (NO in S607), transmission of an off-hook signal and a selection number signal of modem 72a to the communication line is commanded to modem 52 (S609).

By the process in step S609, a determination in the next step S607 is "YES". In this case, when the telephone machine 53 of the user is "in use (the communication line is busy)", and modem 52 can not transmit an off-hook signal and a selection signal (a selection number signal of modem 72a, or a selection number signal of modem 72b) to the communication line (YES in S611), a time a predetermined time after is set as a re-dialing time (S613) By the process in S613, a determination in step S603 stays as "YES" until the re-dialing time, and the process of calling the center side modem 72a is not executed. When it comes to the re-dialing time, with NO in S603→NO in S605→NO in S607→S609, transmission of an off-hook signal and a selection number signal of modem 72a is commanded to modem 52 again.

When a determination is made that modem 72a of the center A device is "(the line is) busy (the communication line of the center A device is occupied)" (YES in S615) as a result of transmission of the off-hook signal and the selection number signal of modem 72a to the communication line from modem 52 by the process in the step S609, the re-dialing time process (FIG. 15, described later) is executed (S617). Thus, the determination in step S603 stays as "YES" until the time set in the re-dialing time process, and the process of calling center side modem 72a is not executed. When the time set in the process is attained, the modem 72a of the center A device is called again.

After the re-dialing time process (S617), a determination is made as to whether it is an emergency mode (trouble occurrence, for example) or not, and if it is an emergency mode (YES in S619), on condition that data has not been transmitted to the center B device yet (NO in S621), transmission of an off-hook signal and a selection number signal of modem 72b to the communication line is commanded for modem 52 (S623). That is, if it is in the emergency mode, the center B device is called.

When an off-hook signal and a selection number signal (a selection number signal of modem 72a or a selection number signal of modem 72b) are transmitted from modem 52 to the communication line by the process in the step S609 or S623, and the communication line is connected to modem 72a of the center A device or modem 72b of the center B device accordingly (YES in S605), the processes after step S631 are executed.

That is, if the selection number transmitted to the communication line is a selection number of modem 72a of the center A device (NO in S631), data transmission permission from CPU 91a of the center A device is waited for. Then, when transmission is enabled (YES in S641), data is transmitted to the center A device (S645). The data transmitted in the step S645 is data defined with a transmission flag set to "1". When the data communication is completed (YES in S643), the transmission flag is reset to "0" (S647), and a line disconnecting signal is transmitted to the communication line to disconnect the communication line to modem 72a of the center A device (S649).

On the other hand, if the selection number transmitted to the communication line is a selection number of modem 72b of the center B device (YES in S631), after waiting for a data transmission permission from CPU 91b of the center B device, when transmission is enabled (YES in S651), trouble data is transmitted to the center B device (S655). When the transmission of trouble data is completed (YES in S653), a line disconnecting signal is transmitted to the communication line to disconnect the communication line to modem 72b of the center B device (S659).

Next, the re-dialing time process (refer to FIG. 15, S617) will be described.

The re-dialing time process is a process for setting a retransmission (re-dial = re-call) time when connection can not be made with CPU 91a of the center A device (YES in S615).

First, a counter for counting the number of re-dialing times (a re-dial counter) is counted up (S661). The counter is cleared after the communication line is connected to the center side.

Next, a determination is made as to whether the current call is a call in the emergency mode or not (the trouble transmission, for example). As a result, if it is an emergency mode (YES in S663), on condition that the re-dial counter value is less than "a" times (=about 10-20 times) (YES in S665), a time one minute after the present time is set as the next calling (re-dialing) time (S667). That is, in the emergency mode, the center A device is called every one minute until the number of re-dialing time reaches "a".

When the number of times of redialing in the emergency mode reaches "a" (NO in S665), a predetermined time on the next day is set as a re-dialing time (S669) This is done in order not to interrupt use of telephone machine 53 and the like by occupying the communication line on the user side when connection can not be made to the center A device in spite of calls of "a" times (abnormal busy condition of the line, operational stop of CPU 91a of the center A device, for example, are possible).

On the other hand, if a determination is made that it is not the emergency mode in step S663 (NO in S663), on condition that the re-dialing counter value is less than b (YES in S 671), an arbitrary even minute time within 20 minutes from the current time is set as the next calling (re-dialing) time on the basis of a random number (S673). Thus, even if calls to the center A device are caused from a large number of data terminals, the re-dialing times of respective data terminals are dispersed to enhance the possibility of connecting to the center A device.

When the number of times of re-dialing in the non-emergency mode attains "b" or more (NO in S671), a predetermined time on the next day is set as the next re-dialing time (S675). This is done in order not to prevent use of telephone machine 53 and the like by occupying the communication line on the user side when connection can not be made to the center A device in spite of calls to the center A device of "b" times (abnormal busy condition of the communication line, operation stop of CPU 91a of the center A device are possible, for example).

The line connection process is carried out as described above and data is transmitted to the center A device or the center B device, and also data from the center A device is received as needed.

Processes at the Center

Figure 16:
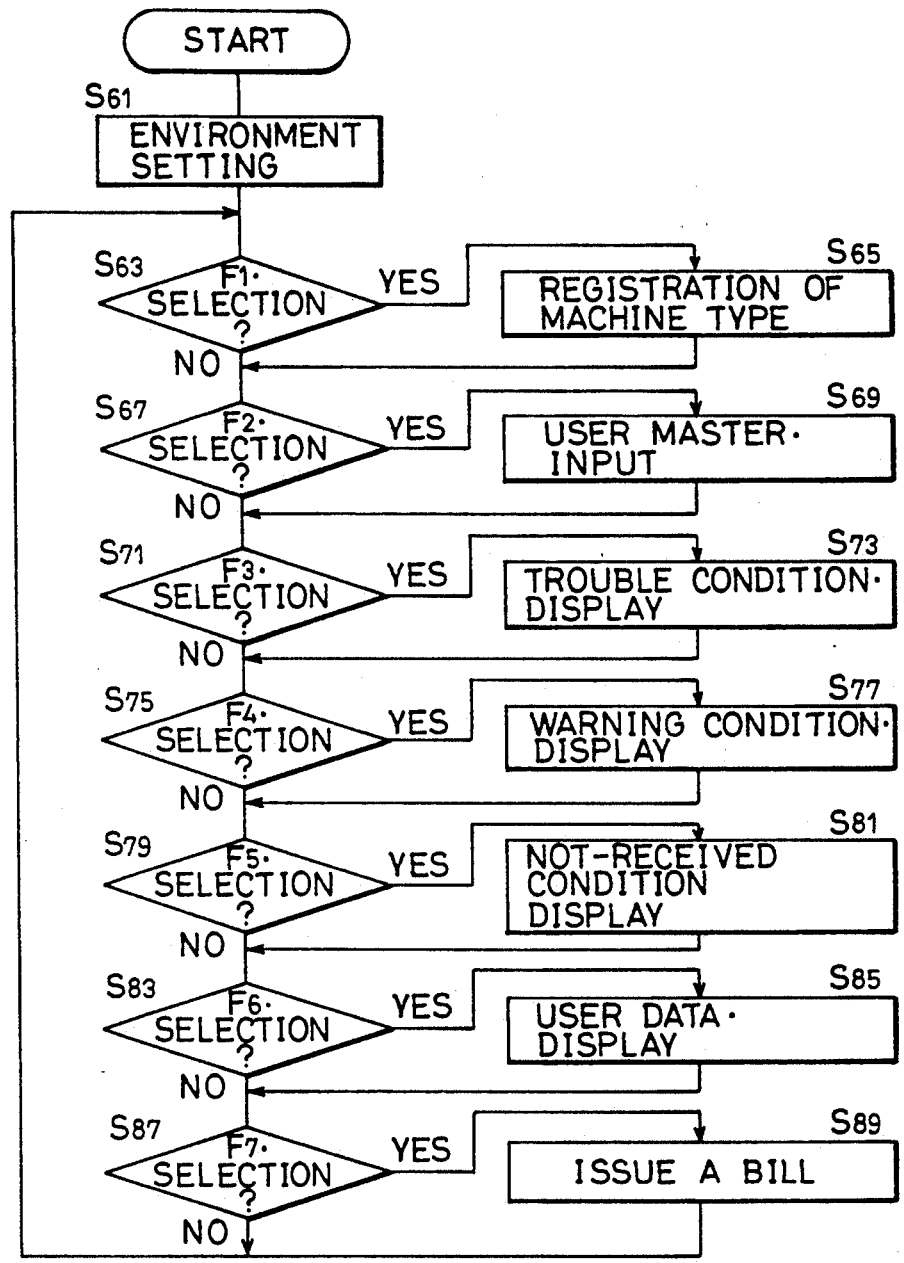
FIG. 16 is a flow chart showing a main routine of the control CPU 91a the computer of a center A device which is connected to the data terminal in FIG. 2 through the communication network.
Figure 17:
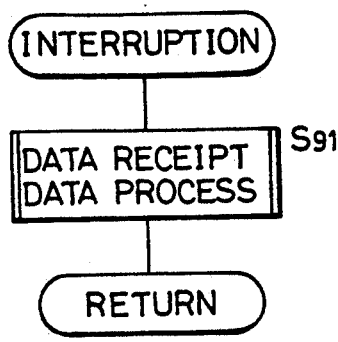
FIG. 17 is a flow chart showing the interruption process for CPU 91a of the center A device.
Figure 18:
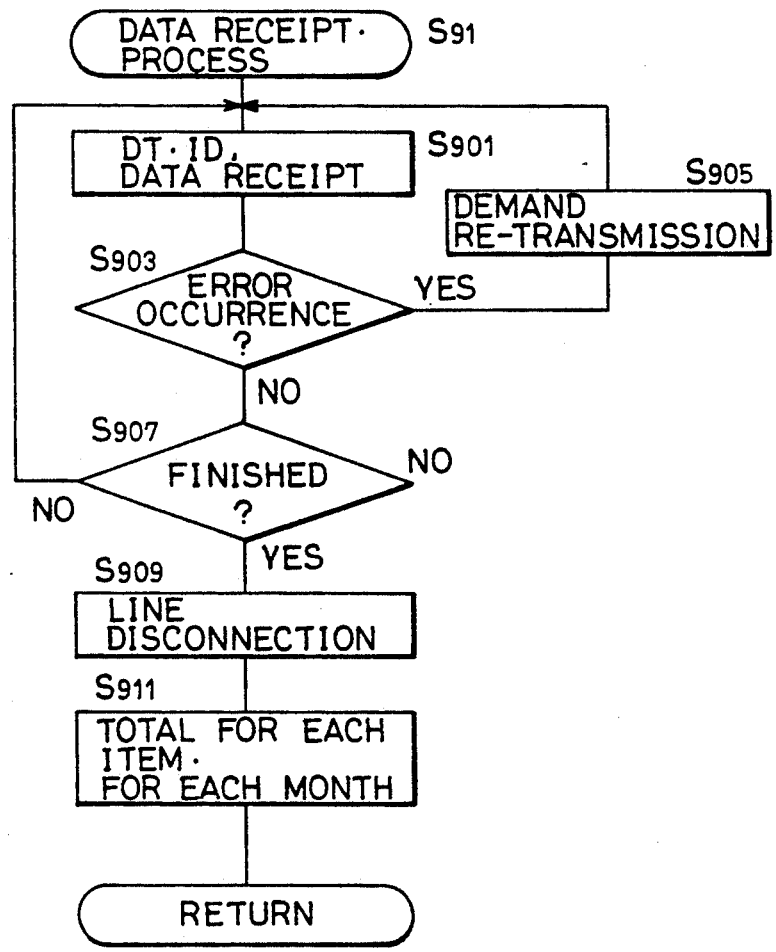
FIG. 18 is a flow chart showing specific contents of the interruption process routine of FIG. 17.

Next, processes in CPU 91a provided in the computer of the center A device are described referring to Figs. 16-18.

(a) F1–F7 Key Processes (FIG. 16)

CPU 91a starts processing upon turn-on of a power source, and performs environment setting of a modem, a printer and the like (S61). Subsequently, in response to input operation of each key F1–F7, the following modes are set or the following processes are executed.

F1 key operation (YES in S63)

A mode for accepting machine model registration is set (S65). That is, new registration of machine model name, the number of items of element data, a name of each element data, a standard threshold value of each element data, a standard threshold value of each counter data, etc. are accepted.

F2 key operation (YES in S67)

A registration acceptance mode of a user master is set (S69). That is, new registration of a name of user, address, telephone number, date and time of fixed time transmission, etc. are accepted.

F3 key operation (YES in S71)

The trouble conditions are displayed (S73) That is, user information (a name of the user, address, telephone number, a machine type name) of a copying machine of trouble transmission, date and hour of occurrence and so forth are displayed in display 92a together with contents of the trouble. The number of trouble cases is always displayed in a corner portion of display 92a without any connection with operation of F3 key.

F4 key operation (YES in S75)

A warning condition is displayed (S77). That is, user information and so forth of a copying machine of the warning transmission are displayed in display 92a together with the contents of the warning. The number of warning cases is always displayed in a corner portion of display 92a without any connection with operation of the F4 key.

F5 key operation (YES in S79)

A not-received condition is displayed (S81). That is, user information of a copying machine which does not make fixed time transmission even after a predetermined fixed time transmission time is displayed in display 92a. The number of no receipt cases is always displayed in a corner portion of display 92a without any connection with operation of the F4 key.

F6 key operation (YES in S83)

A display mode for user data is implemented (S85) That is, when a user is selected, user information is displayed in display 92a. Also, if a sub menu is selected, count values of various counters of the copying machine of the particular user (a total counter, a counter for each paper size, a JAM counter, a trouble counter, a PM counter) and element data are displayed for every month or for every item.

F7 key operation (YES in S87)

A bill is printed out (S89) For example, an amount asked is calculated on the basis of a count value of the total counter and a predetermined calculation expression, and printer 94a is activated to print it out.

(b) Interruption Process (FIGS. 17 and 18)

CPU 91a receives data transmitted from the data terminal by interruption and applies predetermined processes to the received data (S91).

First, when an interruption occurs due to receipt from the communication line, the data transmitted from the data terminal side is received (S901)

When a communication error occurs (YES in S903), retransmission of data such as DTID is requested to the data terminal side (S905).

When the communication with the data terminal has been normally finished without a communication error (YES in S907), the communication line to the data terminal is disconnected (S909), and then totalization is made for each item, for each mouth to produce data to be displayed on a screen by an operator's selection (S911).

As described above, processes in CPU 41 of a copying machine, CPU 11 of a data terminal, and CPU 91a of the center A device are performed, and the present system in which each user and the center which is a management party (the center A device or the center B device) are connected through a communication line is controlled.

In the present embodiment, since the center A device and the center B device have the same structure, the description of the center B device is not repeated.

Although the communication between the center A device and the center B device is not described in the first embodiment, when telephone machine 73a of the center A is in use and connection can not be made to CPU 91a in FIG. 2, trouble data may be transmitted by an interruption from CPU 91b of the center B device to CPU 91a of the center A device.

Also, the center B device may be used as a back-up device of the center A device to enhance the safety of the system.

Next, the second embodiment of the present invention will be described.

Although two centralized control units (computers) are provided on the center side in the above-described first embodiment, only a normal telephone machine is provided in place of the center B device in the second embodiment. Only different points from the first embodiment are described.

Figure 19:
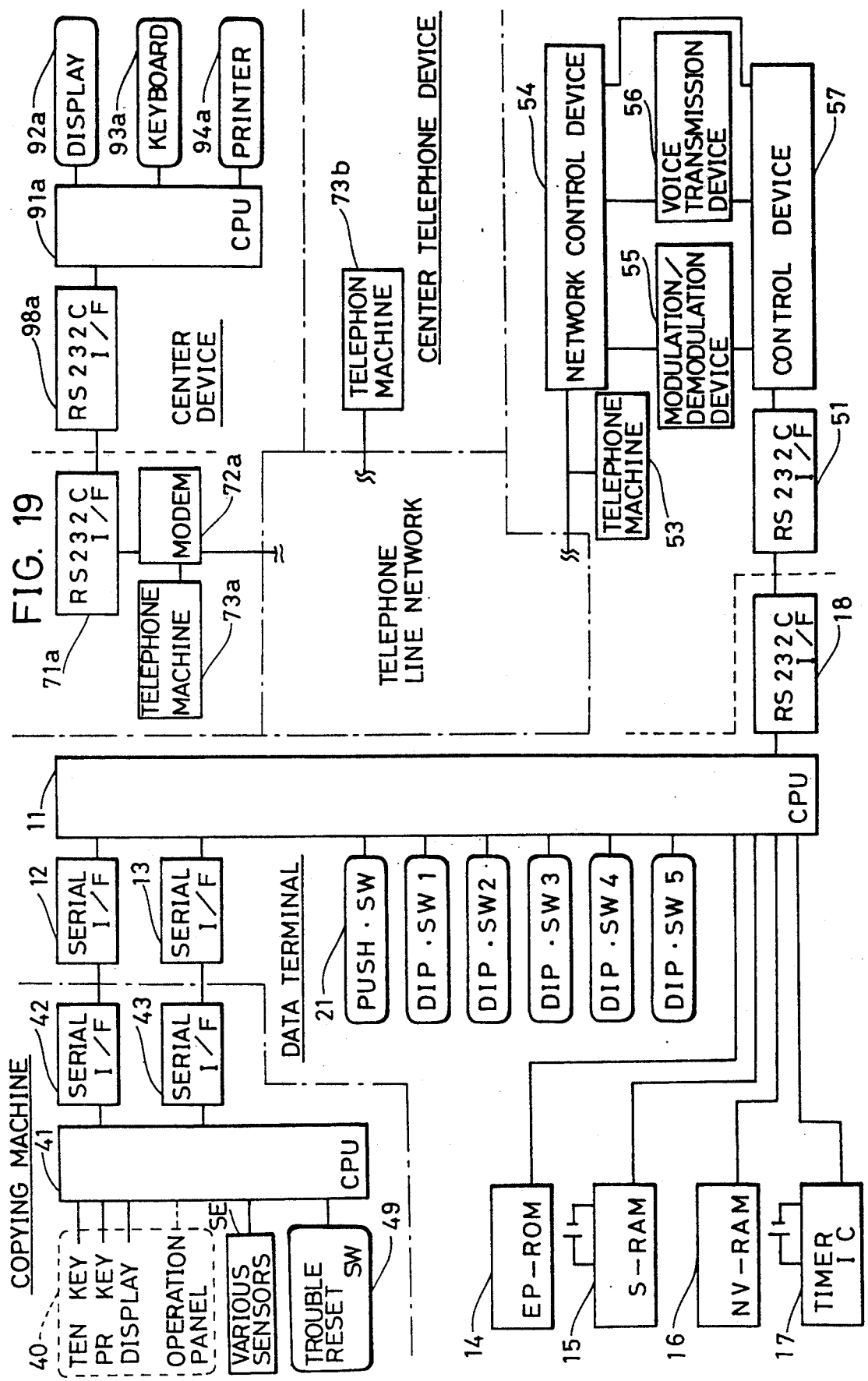
FIG. 19 is a block diagram showing circuit structure of a copying machine control system according to the second embodiment of the present invention.

As shown in FIG. 19, telephone machine 73b provided on the center side is connected to the telephone network. CPU 11 of a data terminal is connected to the telephone network through a RS232CI/F18, a RS232CI/F51, a control device 57, a modulation/demodulation device 55, a speech transmitting device 56, and a network control device 54. The control unit 57 makes a determination as to whether data from CPU 11 should be transmitted to the center A device or to the telephone machine 73b. Then, the data from CPU 11 may be transmitted to the center A device through the modulation/demodulation device 55 and network control device 54, and may be transmitted to telephone machine 73b through speech transmitting unit 56 and network control device 54. Speech transmitting unit 56 stores a voice message corresponding to trouble data from CPU 11 and outputs the stored voice message to network control unit 54 corresponding to the trouble data.

Accordingly, the trouble data transmitted from CPU 11 of a data terminal to telephone machine 73b in step S655 of FIG. 14B is converted into a voice message corresponding to the trouble. Accordingly, an operator at the center can recognize occurrence of the trouble with a voice message from telephone machine 73b.

Next, the third embodiment of the present invention will be described.

Although a normal telephone machine is provided as a center B device in the above-described second embodiment, a facsimile device is provide instead of the telephone machine in the third embodiment. Only different points from the first and second embodiments will be described.

Figure 20:
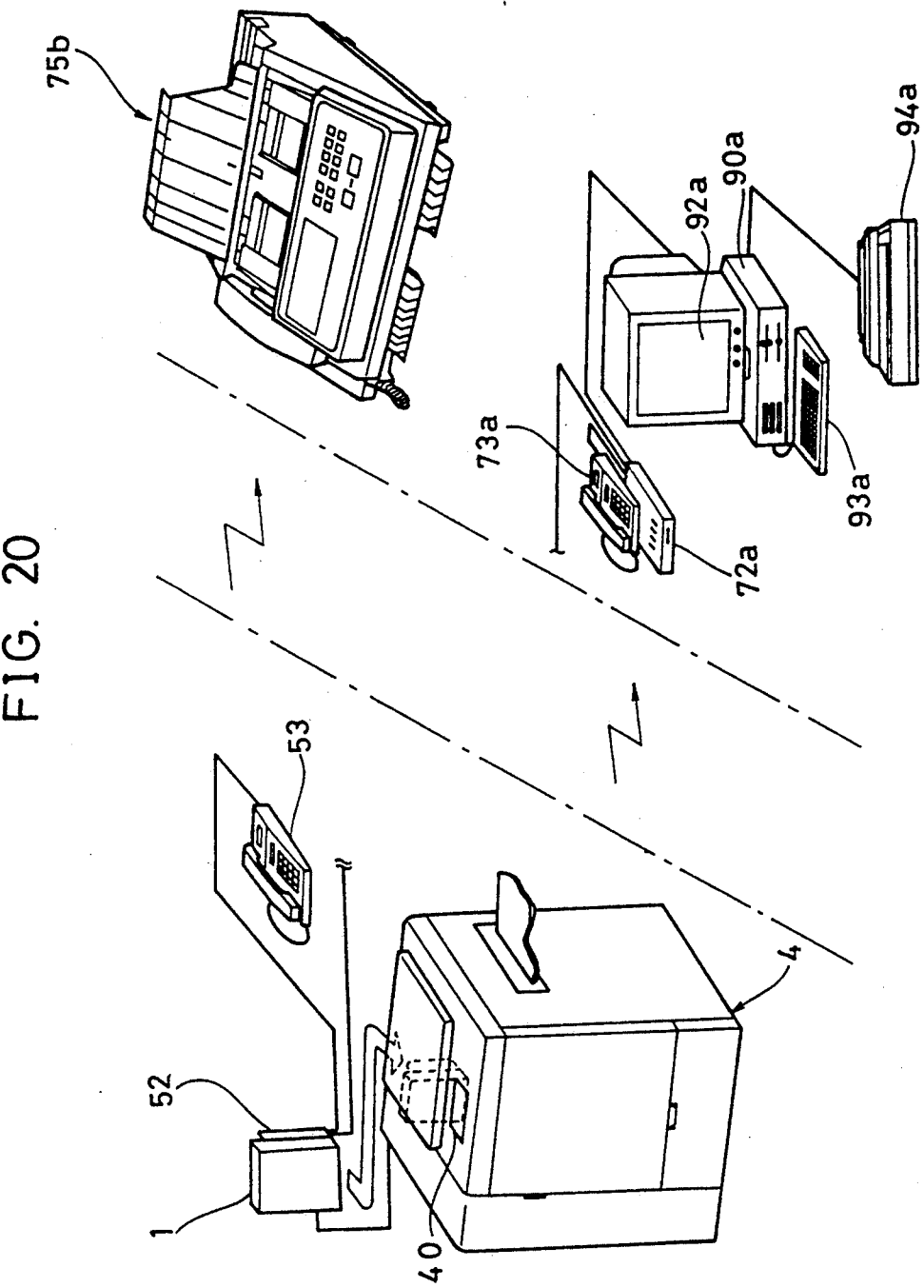
FIG. 20 is a schematic diagram showing structure of a copying machine control system according to the third embodiment of the present invention.

As shown in FIG. 20, a facsimile apparatus 75b provided on the center side is connected to the telephone network. In the structure on the data terminal side, the voice transmitting unit 56 in the second embodiment shown in FIG. 19 is replaced by an image data transmitting unit. A control unit 57 makes a determination as to whether data from a CPU 11 should be transmitted to a center A device or to facsimile device 75b. The data from CPU 11 may be transmitted to the center A device through modulation/demodulation unit 55 and a network control unit 54, or may be transmitted to facsimile device 75b through the image data transmitting unit and the network control unit 54. The image data transmitting unit stores image data corresponding to trouble data from CPU 11 and outputs the stored image data corresponding to the trouble data to network control unit 54.

Accordingly, the trouble data transmitted from CPU 11 of a data terminal to facsimile device 75b in step S655 of FIG. 14B is converted into image data corresponding to the trouble. Accordingly, an operator at the center can know occurrence of the trouble with an image outputted from facsimile device 75b.

Furthermore, in the third embodiment, when a telephone mode is set in facsimile device 75b, it is also possible that change in mode of facsimile device 75b is instructed from the data terminal side with a DTMF signal previously determined between both terminals and, subsequently the image data is transmitted.

Therefore, the trouble data transmitted from CPU 11 of the data terminal to telephone machine 73b in step S655 of FIG. 14B is converted into a voice message corresponding to the trouble. Therefore, an operator at the center can note occurrence of the trouble with a voice message from telephone machine 73b.

Next, the fourth embodiment of the present invention will be described.

In the fourth embodiment, a facsimile device corresponding to a data terminal is provided on the user side. Then, the facsimile device is used for communication from the center side to the user side. Only different points from the first embodiment will be described.

Figure 21:
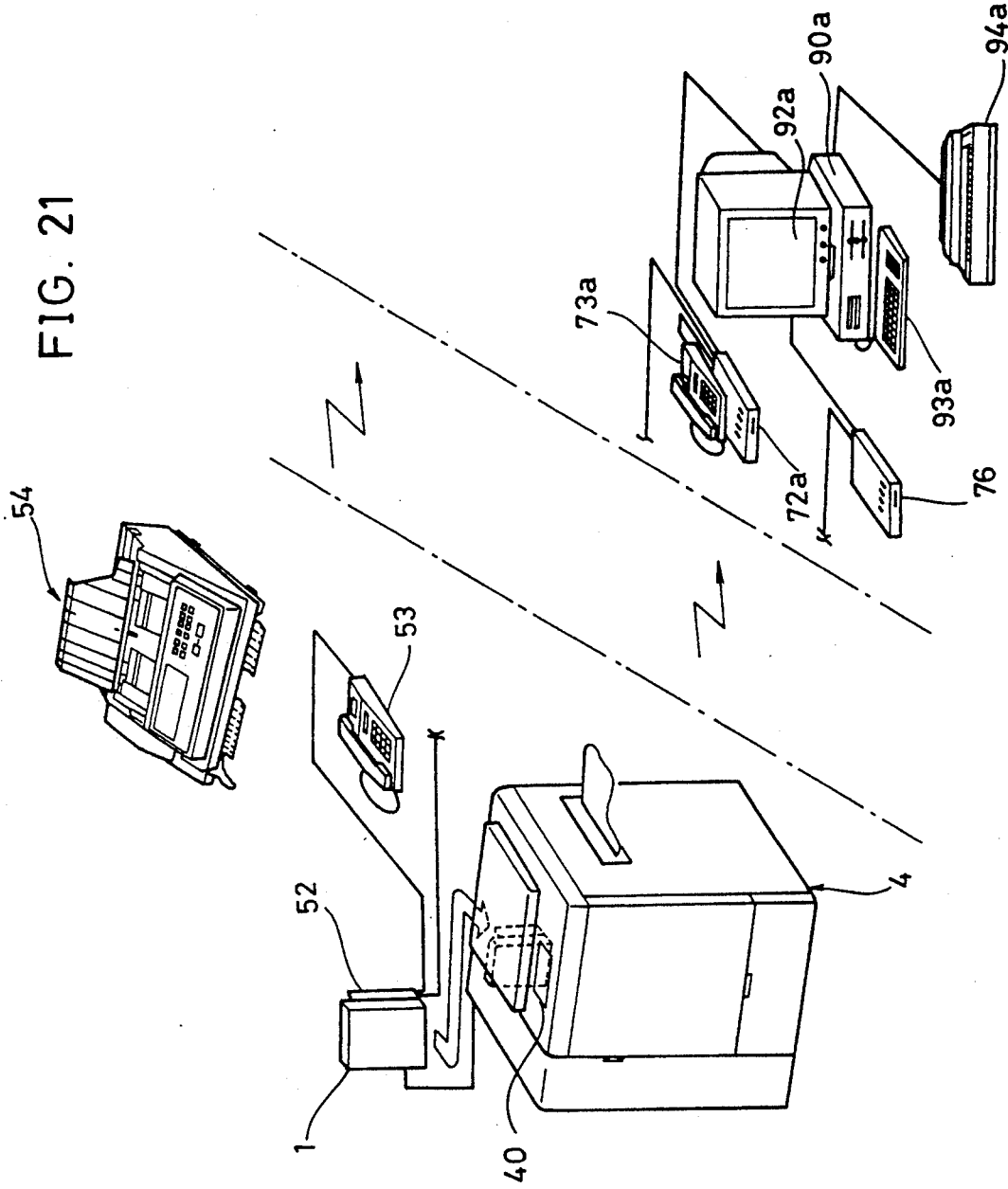
FIG. 21 is a block diagram showing structure of a copying machine control system according to the fourth embodiment of the present invention.
Figure 22:
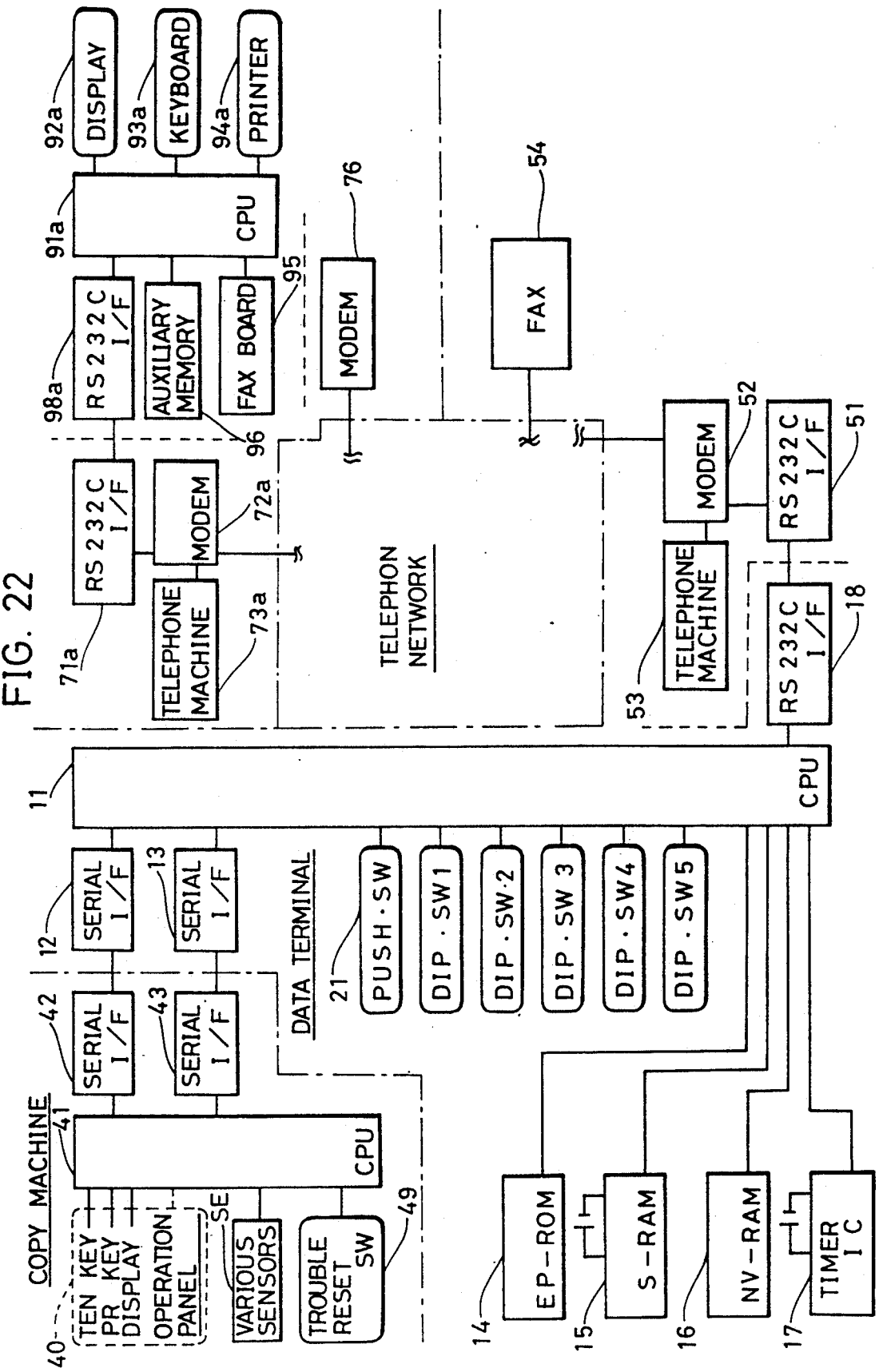
FIG. 22 is a block diagram showing circuit configuration of the copying machine control system according to the fourth embodiment of the present invention.

First, a facsimile device 54 is provided corresponding to data terminal 1 on the user side (refer to FIGS. 21 and 22). A CPU 91a of a center side A device is connected to the telephone network through a FAX board 95 providing a facsimile function and a modem 76. Description about the center side B device is omitted for simplification in these figures.

Figure 23:
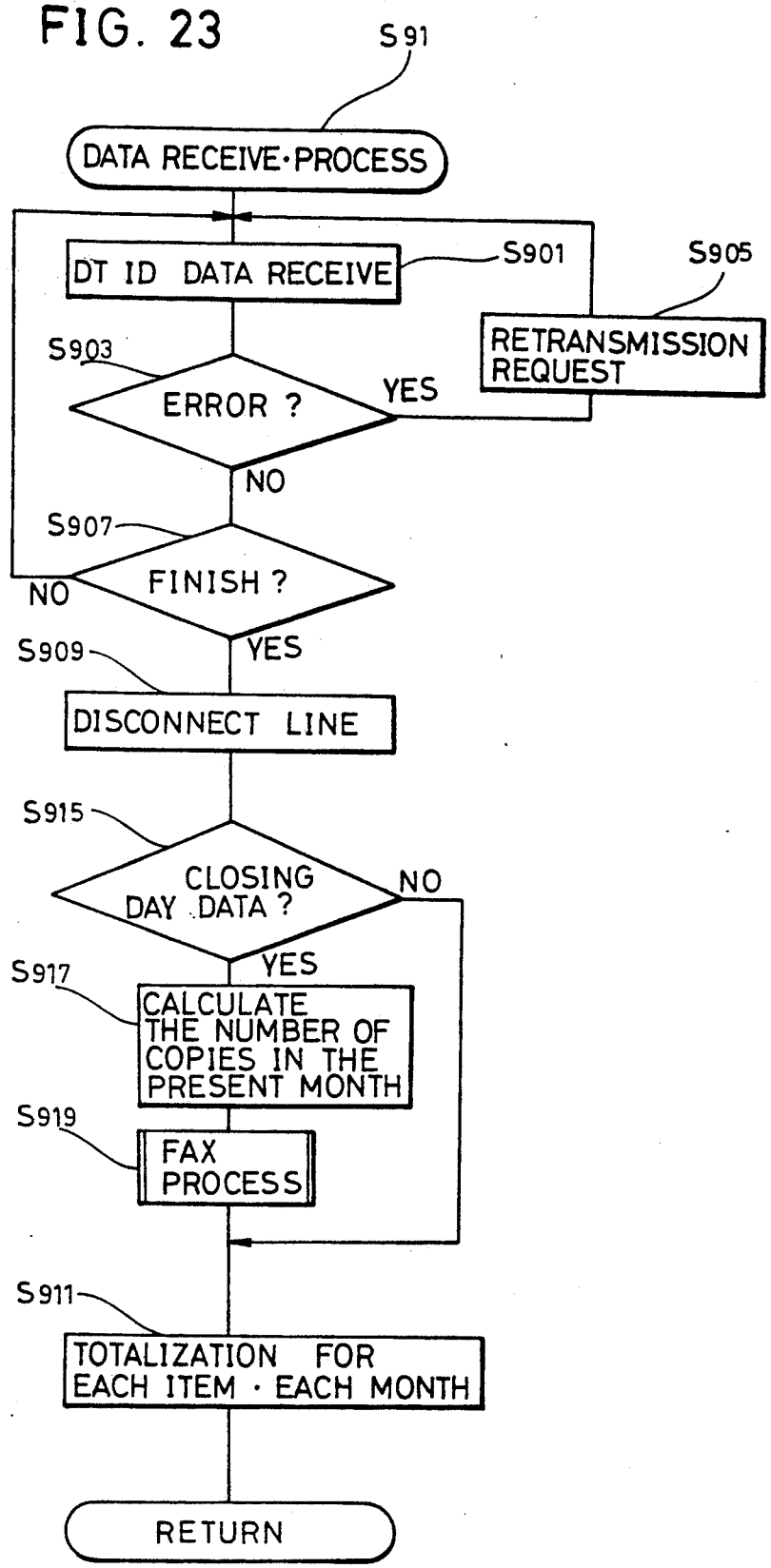
FIG. 23 is a flow chart showing specific contents of the data receiving processing routine in the center A device in the fourth embodiment of the present invention.

The processes by the center A device in the first embodiment shown in FIG. 18 are modified as shown in FIG. 23.

In FIG. 23, the processes in steps S901 through S909 are the same as those in FIG. 18, so that the description thereof is not repeated. After disconnecting the line in step S909, a determination is made as to whether the received data is closing day data or not (S915). The closing day data is fixed time transmission data at the last day in a month, for example, which is data transmitted on the term day of calculating the amount to be asked. When it is closing day data (YES in S915), the number of copies in that month is calculated (S917). Subsequently, a FAX number corresponding to the DTID of the data terminal which transmitted the closing day data is read out of a memory, and image information corresponding to the calculated number of copies is FAX-transmitted to the user side. The transmitted image information includes the number of copies in that month as shown in FIG. 24. A FAX number corresponding to each DTID is stored in advance in an auxiliary memory 96 of a center side computer as management information. The contents FAX-transmitted from the center side to the user side may include the number of copies in a predetermined time period or the amount to be asked on the basis of the number of copies.

Next, the fifth embodiment of the present invention will be described.

Although image information is transmitted from the center to a facsimile device corresponding to a DT in the above-described fourth embodiment, in the fifth embodiment, the image information is transmitted from the center to the copying machine through the DT when the copying machine connected to the DT has a digital image forming function capable of forming an image on the basis of an electrical signal. Binary code data indicating character is employed as the image information.

Only different points from the fourth embodiment will be described below.

First, the copying machine 4 is such a digital copying machine as described in U.S. Pat. No. 4,807,046, which can form an image on the basis of an electrical signal. The image forming method of the copying machine 4, however, may be the optical recording method employing LED array, liquid crystal array, PLZT array or the like, or may be the thermal recording method or the ink jet recording method, as well as one using laser described in U.S. Pat. No. 4,807,046.

As shown in FIG. 25, a font memory FM storing bit image of predetermined characters or graphics corresponding to code data is connected to CPU 41 of copying machine 4. CPU 41 develops an image to be formed in a bit map referring to the font memory FM in response to the received code data. The image forming portion of copying machine 4 forms an image corresponding to the bit map.

Accordingly, when the data transmitted from the DT is manual transmission data and that DT is connected to a copying machine having a digital image forming function, CPU 91 at the center transmits code data corresponding to the image information B (FIG. 24) to the DT through the network. Then, the DT transmits the code data to CPU 41 of the copying machine through serial I/Fs 13 and 43. CPU 41 of the copying machine makes the image forming portion form an image in response to the received code data.

CPU 91 stores a telephone number of a DT and a copying machine model corresponding to each DTID for the code data transmission. Since it stores a copying machine model corresponding to each DT, a determination can be made that the DT is connected to a copying machine having a digital image forming function. On the other hand, when data transmitted from a certain DT is closing day data, when the DT is connected to a copying machine having no digital image forming function, the image information may be transmitted to the facsimile device as described above.

Also, in the above-described fourth and fifth embodiments, closing dates of respective data terminals can be stored in the centralized control unit. In this case, the centralized control unit transmits image information to destinations corresponding to respective data terminals at the time when closing dates of the respective data terminals have passed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine control system having a data terminal collecting data related to a copying machine and a centralized control station communicating data with the data terminal through a communication network, wherein:
    said centralized control station comprises;
        a first communication terminal, and
        a second communication terminal,
    said data terminal comprises;
        storing means for storing first and second calling data for calling said first and said second communication terminals, respectively,
        first calling means for calling said first communication terminal with said first calling data when a predetermined transmission condition is satisfied;
        determining means for making a determination that connection can not be made to said first communication terminal in spite of operation of said first calling means, and
        second calling means responsive to said determining means for calling said second communication terminal with said second calling data.

2. The copying machine control system according to claim 1, wherein forms of data to be received by said first communication terminal and said second communication terminal differ from each other.

3. The copying machine control system according to claim 2, wherein said data terminal comprises changing means for changing a data format to be transmitted to said centralized control station so that the data format in communication with said first communication terminal and the data format in communication with said second communication terminal differ from each other.

4. A data terminal collecting data related to a copying machine and communicating with first and second communication terminals through a communication network, comprising:
    storing means for storing first and second calling data for calling said first and said second communication terminals, respectively;
    first calling means for calling said first communication terminal with said first calling data when a predetermined transmission condition is satisfied;
    determining means for making a determination that connection can not be made to said first communication terminal in spite of operation of said first calling means; and
    second calling means responsive to said determining means for calling said second communication terminal with said second calling data.

5. The data terminal according to claim 4, further comprising changing means for changing a data format to be transmitted to a centralized control station so that the data format in communication with said first communication terminal and the data format in communication with said second communication terminal differ from each other.

6. A data terminal collecting data related to a copying machine and communicating with first and second communication terminals through a communication network, comprising:
    storing means for storing first and second calling data for calling said first and said second communication terminals, respectively;
    first calling means for calling said first communication terminal with said first calling data when a predetermined transmission condition is satisfied, the predetermined transmission condition including one with high priority and one with low priority;
    determining means for making a determination that connection is not executed with said first communication terminal in spite of operation of said first calling means;
    distinguishing means for distinguishing the priority of the predetermined transmission condition; and
    second calling means responsive to said determining means and distinguishing means for calling said second communication terminal with said second calling data.

7. The data terminal according to claim 6, further comprising changing means for changing a data format to be transmitted to a centralized control station so that the data format in communication with said first communication terminal and the data format in communication with said second communication terminal differ from each other.

8. The data terminal according to claim 6, wherein said predetermined transmission condition with low priority is satisfied when a present time comes to a predetermined time previously set.

9. The data terminal according to claim 6, wherein said predetermined transmission condition with high priority is satisfied when a trouble occurs.

10. A copying machine control system including a data terminal collecting data related to a copying machine and a centralized control station performing data communication with the data terminal through a communication network: wherein
    said centralized control station comprises;
        a computer for collecting data from said data terminal,
        receiving means called with particular first calling data for inputting data transmitted through said communication network from said data terminal into said computer, and
        telephone machine which is called with particular second calling data, and
    said data terminal comprises;
        storing means for storing said first and said second calling data,
        first communicating means for calling the receiving means with said first calling data when predetermined transmission condition is satisfied and for performing data communication after connection is made with said receiving means,
        determining means for making a determination that connection is not made to said receiving means in spite of operation of said first calling means, and second communicating means for calling said telephone machine with said second calling data in response to a determination of said determining means and for communicating by voice after connection is made to said telephone machine.

11. The copying machine control system according to claim 10, wherein said second communicating means comprises means for storing a voice message corresponding to the transmission condition.

12. A copying machine control system including a data terminal collecting data related to a copying machine and a centralized control station performing data communication with said data terminal through a communication network, wherein:

said centralized control station comprises;
a computer for collecting data from said data terminal,
receiving means, which is called with particular first calling data, for inputting data transmitted through said communication network from said data terminal in the computer; and
facsimile device, which is called with particular second calling data, for printing out received facsimile data, and said data terminal comprises;
storing means for storing said first and said second calling data,
first communicating means for calling said receiving means with said first calling data when a predetermined transmission condition is satisfied and for making data communication after connection is made with said receiving means,
determining means for making a determination that connection with said receiving means is not made in spite of operation of said first communication means, and
second communicating means for calling said facsimile device with said second calling data in response to a determination of said determining means and for communicating facsimile data after connection is made to said facsimile device.

13. A copying machine control system including a data terminal collecting data related to a copying machine, a centralized control station performing data communication with said data terminal through a communication network, and a facsimile device provided corresponding to said data terminal, wherein said data terminal comprises;
counting means for counting the number of copies, and
first transmitting means for transmitting said counted number of copies to said centralized control station, and said centralized control station comprises;
receiving means for receiving the number of copies transmitted from said first transmitting means,
totalizing means for totalizing the received number of copies, and
second transmitting means for transmitting image information on the basis of the totalized number of copies to said facsimile device.

14. The copying machine control system according to claim 13, wherein said totalizing means totalizes the number of copies within a predetermined time period.

15. The copying machine control system according to claim 13, wherein said second transmitting means stores a telephone number of said facsimile device.

16. A centralized control unit receiving data related to a plurality of copying machines and controlling each of said copying machines, comprising receiving means for receiving count data of the number of copies in said plurality of copying machines;
totalizing means for totalizing said received count data for each of said copying machines;
storing means for storing a telephone number of a facsimile device provided corresponding to each of said copying machines; and
transmitting means for transmitting image information on the basis of said totalized count data to the facsimile device provided corresponding to each of said copying machines.

17. The centralized control unit according to claim 16, wherein said totalizing means totalizes the number of copies within a predetermined time period about each of said copying machines.

18. A copying machine control system including a data terminal collecting data related to a copying machine and a centralized control station communicating data with said data terminal through a communication network, wherein said data terminal comprises;
counting means for counting the number of copies,
first transmitting means for transmitting the counted number of copies to said centralized control station, and
image forming means for making said copying machine form an image corresponding to the image information from said centralized control station, and said centralized control station comprises;
receiving means for receiving the number of copies transmitted from said first transmitting means,
totalizing means for totalizing the received number of copies, and
second transmitting means for transmitting the image information on the basis of the totalized number of copies to said data terminal.

19. The copying machine control system according to claim 18, wherein said totalizing means totalizes the number of copies within a predetermined period.

20. The copying machine control system according to claim 18, wherein said second transmitting means stores a telephone number of said data terminal.

21. A centralized control unit receiving data related to a plurality of copying machines through a communication network and controlling the copying machines, comprising:

receiving means for receiving count data of the number of copies in said plurality of copying machines;
totalizing means for totalizing said received count data for each of said copying machines;
storing means for storing a telephone number of a destination set corresponding to each of said copying machines; and
transmitting means for transmitting image information on the basis of said totalized count data to the destination set corresponding to each of said copying machines.

22. The centralized control unit according to claim 21, wherein said totalizing means totalizes the number of copies within a predetermined period for each of said copying machines.

* * * * *